United States Patent
Xu et al.

(10) Patent No.: US 12,207,198 B2
(45) Date of Patent: Jan. 21, 2025

(54) WAKE UP SIGNAL MONITORING OCCASIONS

(71) Applicant: QUALCOMM Incorporated, San Diego, CA (US)

(72) Inventors: Huilin Xu, Temecula, CA (US); Yuchul Kim, San Diego, CA (US); Nicolas Cornillet, Lannion (FR); Jay Kumar Sundararajan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 348 days.

(21) Appl. No.: 17/658,412

(22) Filed: Apr. 7, 2022

(65) Prior Publication Data
US 2023/0328649 A1 Oct. 12, 2023

(51) Int. Cl.
*H04W 52/02* (2009.01)
*H04W 76/28* (2018.01)

(52) U.S. Cl.
CPC ....... *H04W 52/0235* (2013.01); *H04W 76/28* (2018.02)

(58) Field of Classification Search
CPC .......................... H04W 52/0235; H04W 76/28
USPC ......................................................... 370/311
See application file for complete search history.

(56) References Cited

U.S. PATENT DOCUMENTS

| | | | |
|---|---|---|---|
| 2014/0064170 A1* | 3/2014 | Seo .................. | H04W 52/0235 370/311 |
| 2017/0251518 A1* | 8/2017 | Agiwal ............... | H04W 76/28 |
| 2018/0027495 A1* | 1/2018 | Song .................... | G06F 1/3206 455/343.2 |
| 2018/0332533 A1* | 11/2018 | Bhattad ............. | H04W 52/0235 |
| 2018/0332549 A1* | 11/2018 | Bhattad ............... | H04W 56/001 |
| 2020/0267646 A1* | 8/2020 | Nam ................. | H04W 52/0229 |
| 2020/0314748 A1* | 10/2020 | Kim ...................... | H04L 5/0053 |
| 2020/0351780 A1* | 11/2020 | Liao ..................... | H04W 76/28 |
| 2021/0045056 A1* | 2/2021 | Nam .................. | H04W 52/0216 |
| 2021/0068055 A1* | 3/2021 | Nam .................... | H04L 5/0053 |
| 2021/0259044 A1* | 8/2021 | Islam ............... | H04W 52/0229 |
| 2022/0110054 A1* | 4/2022 | Seo .................... | H04W 52/0212 |
| 2022/0272636 A1* | 8/2022 | Li .......................... | H04W 52/02 |
| 2022/0394617 A1* | 12/2022 | Li ....................... | H04W 52/028 |
| 2023/0189147 A1* | 6/2023 | Bala ...................... | H04W 68/02 370/311 |

* cited by examiner

*Primary Examiner* — Mark G. Pannell
(74) *Attorney, Agent, or Firm* — Harrity & Harrity LLP / Qualcomm Incorporated

(57) ABSTRACT

Various aspects of the present disclosure generally relate to wireless communication. In some aspects, a user equipment (UE) may receive a wake up signal (WUS) within a WUS monitoring occasion (WMO) indicating to initiate a discontinuous reception (DRX) on-duration, a time to initiate the DRX on-duration being based at least in part on a timing of the WMO within a set of WMOs. The UE may receive a communication based at least in part on initiating the DRX on-duration at the time. Numerous other aspects are described.

30 Claims, 13 Drawing Sheets

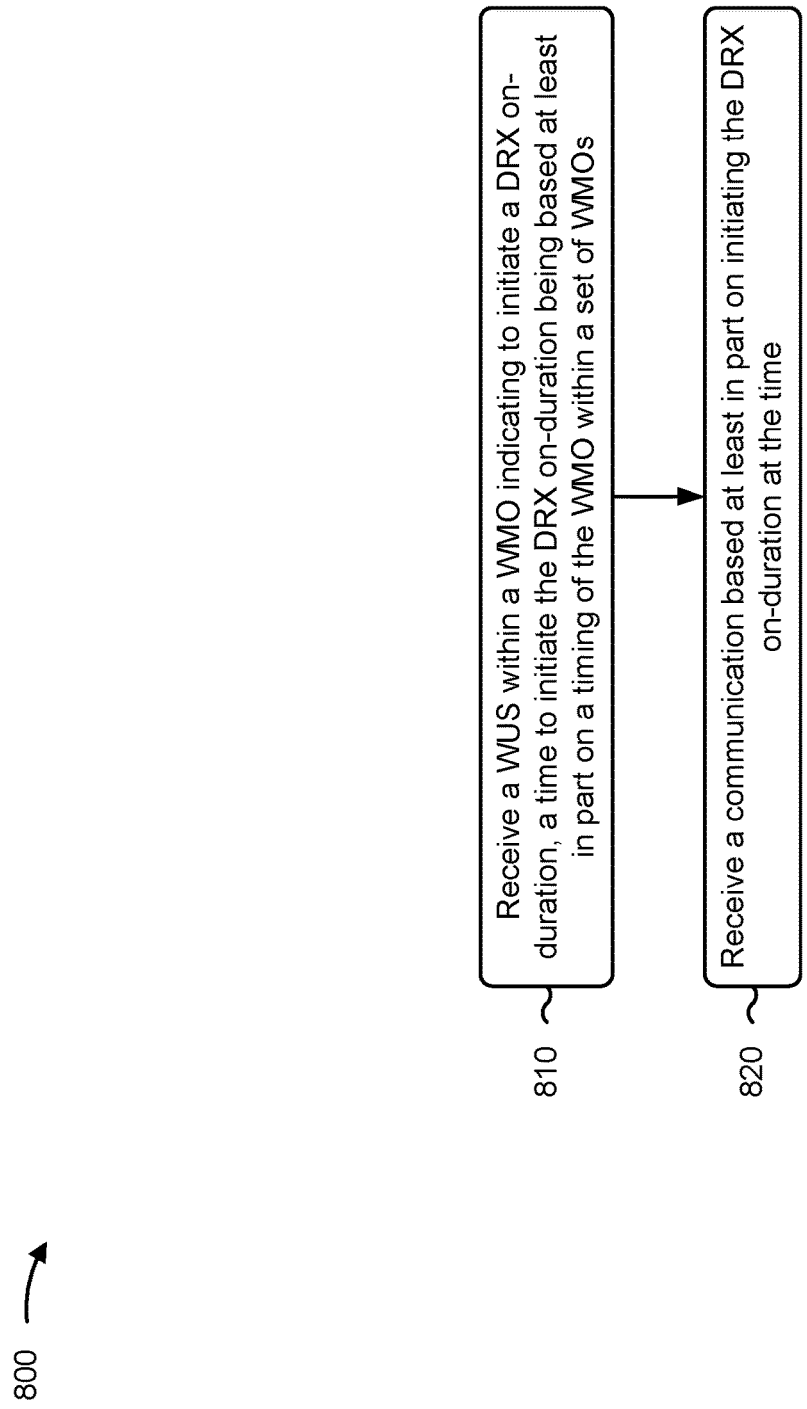

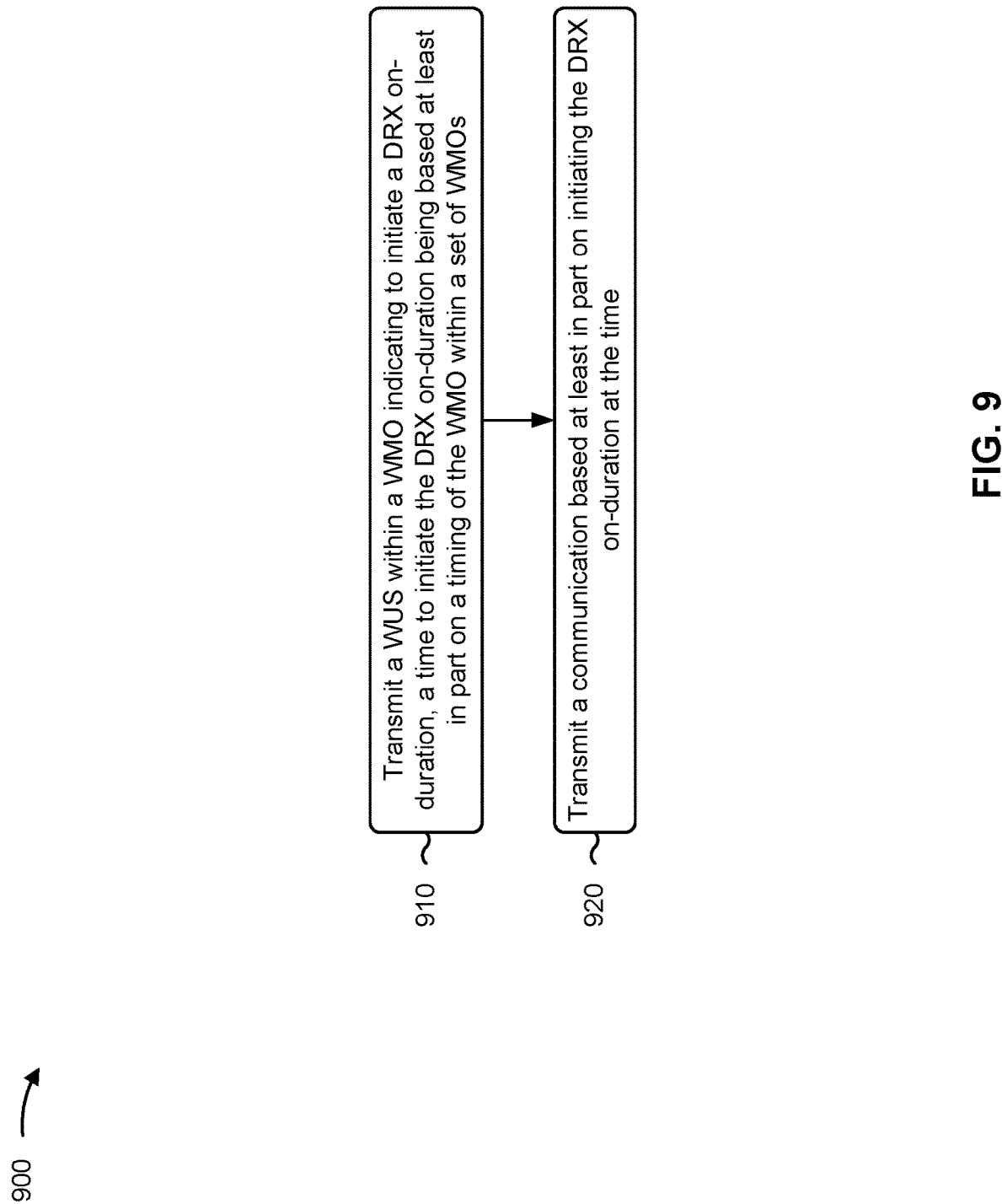

WAKE UP SIGNAL MONITORING OCCASIONS

FIELD OF THE DISCLOSURE

Aspects of the present disclosure generally relate to wireless communication and to techniques and apparatuses for wake up signal monitoring occasions.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving a wake up signal (WUS) within a WUS monitoring occasion (WMO) indicating to initiate a discontinuous reception (DRX) on-duration, a time to initiate the DRX on-duration being based at least in part on a timing of the WMO within a set of WMOs. The method may include receiving a communication based at least in part on initiating the DRX on-duration at the time.

Some aspects described herein relate to a method of wireless communication performed by a network node. The method may include transmitting a WUS within a WMO indicating to initiate a DRX on-duration, a time to initiate the DRX on-duration being based at least in part on a timing of the WMO within a set of WMOs. The method may include transmitting a communication based at least in part on initiating the DRX on-duration at the time.

Some aspects described herein relate to a UE for wireless communication. The user equipment may include a memory and one or more processors coupled to the memory. The one or more processors may be configured to receive a WUS within a WMO indicating to initiate a DRX on-duration, a time to initiate the DRX on-duration being based at least in part on a timing of the WMO within a set of WMOs. The one or more processors may be configured to receive a communication based at least in part on initiating the DRX on-duration at the time.

Some aspects described herein relate to a network node for wireless communication. The network node may include a memory and one or more processors coupled to the memory. The one or more processors may be configured to transmit a WUS within a WMO indicating to initiate a DRX on-duration, a time to initiate the DRX on-duration being based at least in part on a timing of the WMO within a set of WMOs. The one or more processors may be configured to transmit a communication based at least in part on initiating the DRX on-duration at the time.

Some aspects described herein relate to a non-transitory computer-readable medium that stores a set of instructions for wireless communication by a UE. The set of instructions, when executed by one or more processors of the UE, may cause the UE to receive a WUS within a WMO indicating to initiate a DRX on-duration, a time to initiate the DRX on-duration being based at least in part on a timing of the WMO within a set of WMOs. The set of instructions, when executed by one or more processors of the UE, may cause the UE to receive a communication based at least in part on initiating the DRX on-duration at the time.

Some aspects described herein relate to a non-transitory computer-readable medium that stores a set of instructions for wireless communication by a network node. The set of instructions, when executed by one or more processors of the network node, may cause the network node to transmit a WUS within a WMO indicating to initiate a DRX on-duration, a time to initiate the DRX on-duration being based at least in part on a timing of the WMO within a set of WMOs. The set of instructions, when executed by one or more processors of the network node, may cause the network node to transmit a communication based at least in part on initiating the DRX on-duration at the time.

Some aspects described herein relate to an apparatus for wireless communication. The apparatus may include means for receiving a WUS within a WMO indicating to initiate a DRX on-duration, a time to initiate the DRX on-duration being based at least in part on a timing of the WMO within a set of WMOs. The apparatus may include means for receiving a communication based at least in part on initiating the DRX on-duration at the time.

Some aspects described herein relate to an apparatus for wireless communication. The apparatus may include means for transmitting a WUS within a WMO indicating to initiate a DRX on-duration, a time to initiate the DRX on-duration being based at least in part on a timing of the WMO within a set of WMOs. The apparatus may include means for transmitting a communication based at least in part on initiating the DRX on-duration at the time.

Aspects generally include a method, apparatus, system, computer program product, non-transitory computer-readable medium, base station, user equipment, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 8 and 9 are diagrams illustrating example processes associated with wake up signal monitoring occasions, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
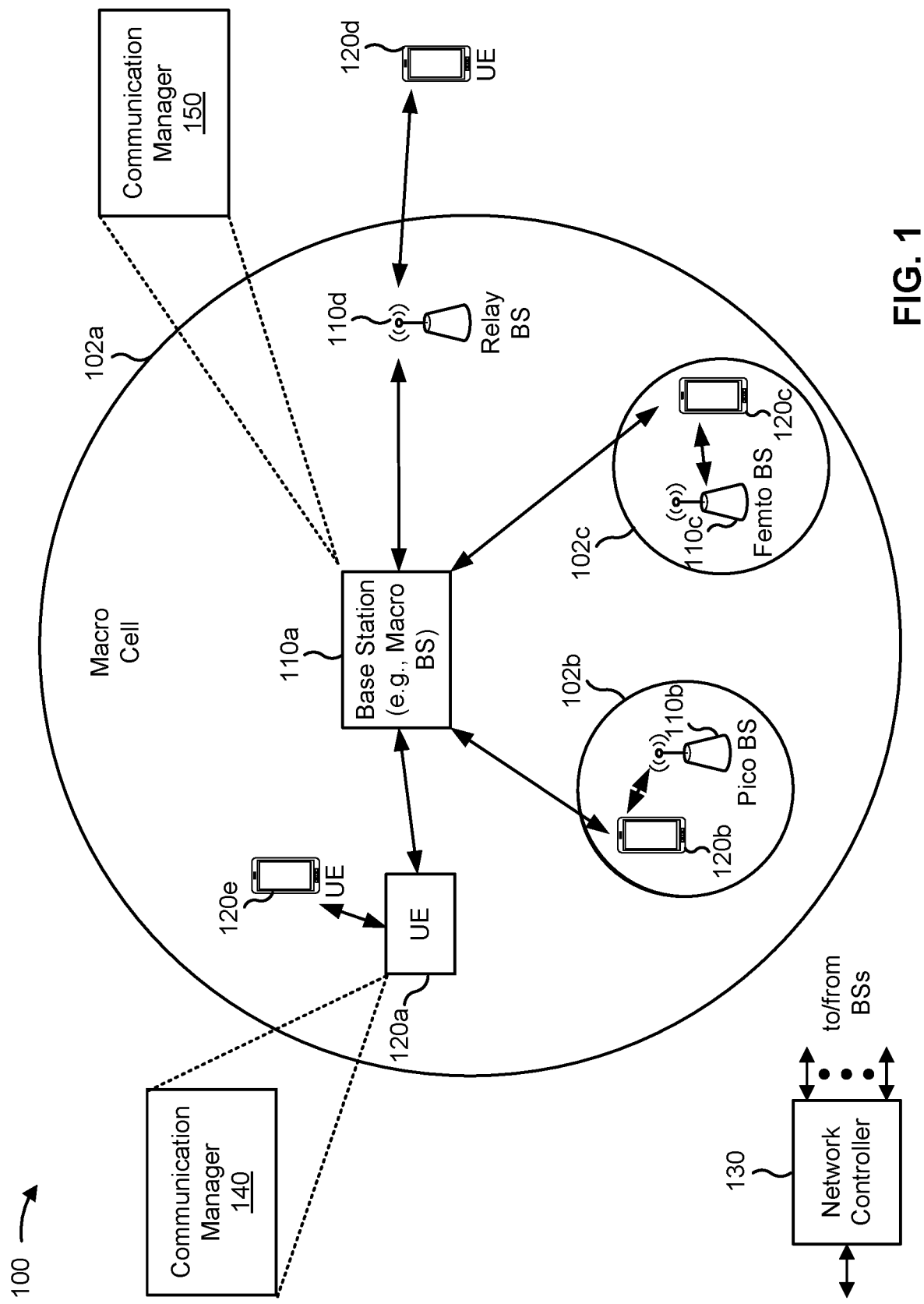
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110*a*, a BS 110*b*, a BS 110*c*, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive a wake up signal (WUS) within a WUS monitoring occasion (WMO) indicating to initiate a discontinuous reception (DRX) on-duration, a time to initiate the DRX on-duration being based at least in part on a timing of the WMO within a set of WMOs; and receive a communication based at least in part on initiating the DRX on-duration at the time. Additionally, or alternatively, the communication manager 140 may perform one or more other operations described herein.

In some aspects, the network node may include a communication manager 150. As described in more detail elsewhere herein, the communication manager 150 may transmit a WUS within a WMO indicating to initiate a DRX on-duration, a time to initiate the DRX on-duration being based at least in part on a timing of the WMO within a set of WMOs; and transmit a communication based at least in part on initiating the DRX on-duration at the time. Additionally, or alternatively, the communication manager 150 may perform one or more other operations described herein.

In some aspects, the term "base station" (e.g., the base station 110) or "network node" or "network entity" may refer to an aggregated base station, a disaggregated base station (e.g., described in connection with FIG. 9), an integrated access and backhaul (IAB) node, a relay node, and/or one or more components thereof. For example, in some aspects, "base station," "network node," or "network entity" may refer to a central unit (CU), a distributed unit (DU), a radio unit (RU), a Near-Real Time (Near-RT) RAN Intelligent Controller (RIC), or a Non-Real Time (Non-RT) RIC, or a combination thereof. In some aspects, the term "base station," "network node," or "network entity" may refer to one device configured to perform one or more functions, such as those described herein in connection with the base station 110. In some aspects, the term "base station," "network node," or "network entity" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "base station," "network node," or "network entity" may refer to any one or more of those different devices. In some aspects, the term "base station," "network node," or "network entity" may refer to one or more virtual base stations and/or one or more virtual base station functions. For example, in some aspects, two or more base station functions may be instantiated on a single device. In some aspects, the term "base station," "network node," or "network entity" may refer to one of the base station functions and not another. In this way, a single device may include more than one base station.

As indicated above, FIG. 1 is provided as an example. Other examples may differ from what is described with regard to FIG. 1.

Figure 2:
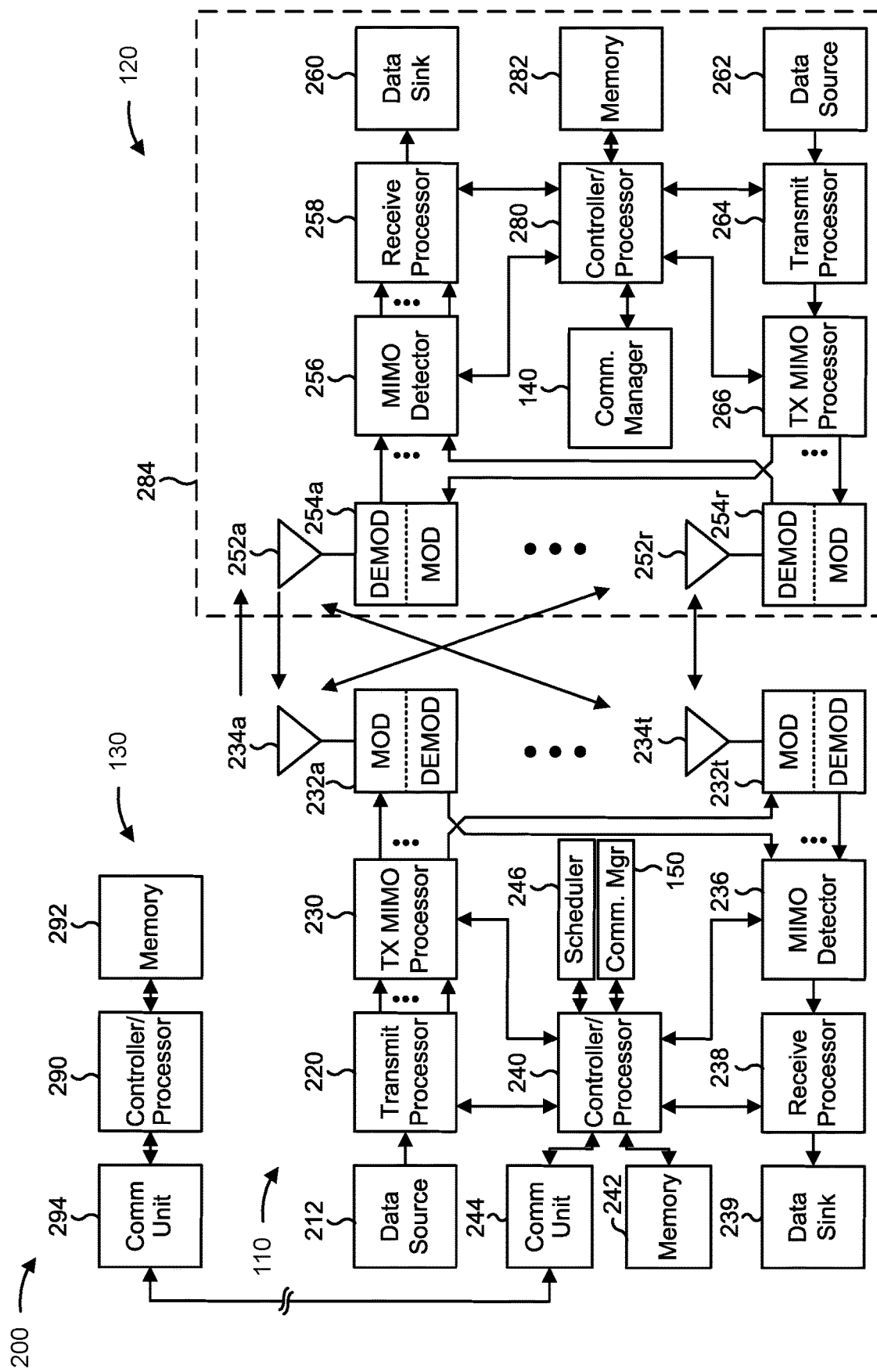
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 6-11).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 6-11).

The controller/processor 240 of the base station 110, the controller/processor 280 of the UE 120, and/or any other component(s) of FIG. 2 may perform one or more techniques associated with wake up signal monitoring occasions, as described in more detail elsewhere herein. For example, the controller/processor 240 of the base station 110, the controller/processor 280 of the UE 120, and/or any other component(s) of FIG. 2 may perform or direct operations of, for example, process 800 of FIG. 8, process 900 of FIG. 9, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, process 900 of FIG. 9, and/or other processes as described herein. In some examples, executing instructions may include running the instructions, converting the instructions, compiling the instructions, and/or interpreting the instructions, among other examples.

In some aspects, the UE includes means for receiving a WUS within a WMO indicating to initiate a DRX on-duration, a time to initiate the DRX on-duration being based at least in part on a timing of the WMO within a set of WMOs; and/or means for receiving a communication based at least in part on initiating the DRX on-duration at the time. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network node includes means for transmitting a WUS within a WMO indicating to initiate a DRX on-duration, a time to initiate the DRX on-duration being based at least in part on a timing of the WMO within a set of WMOs; and/or means for transmitting a communication based at least in part on initiating the DRX on-duration at the time. In some aspects, the means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
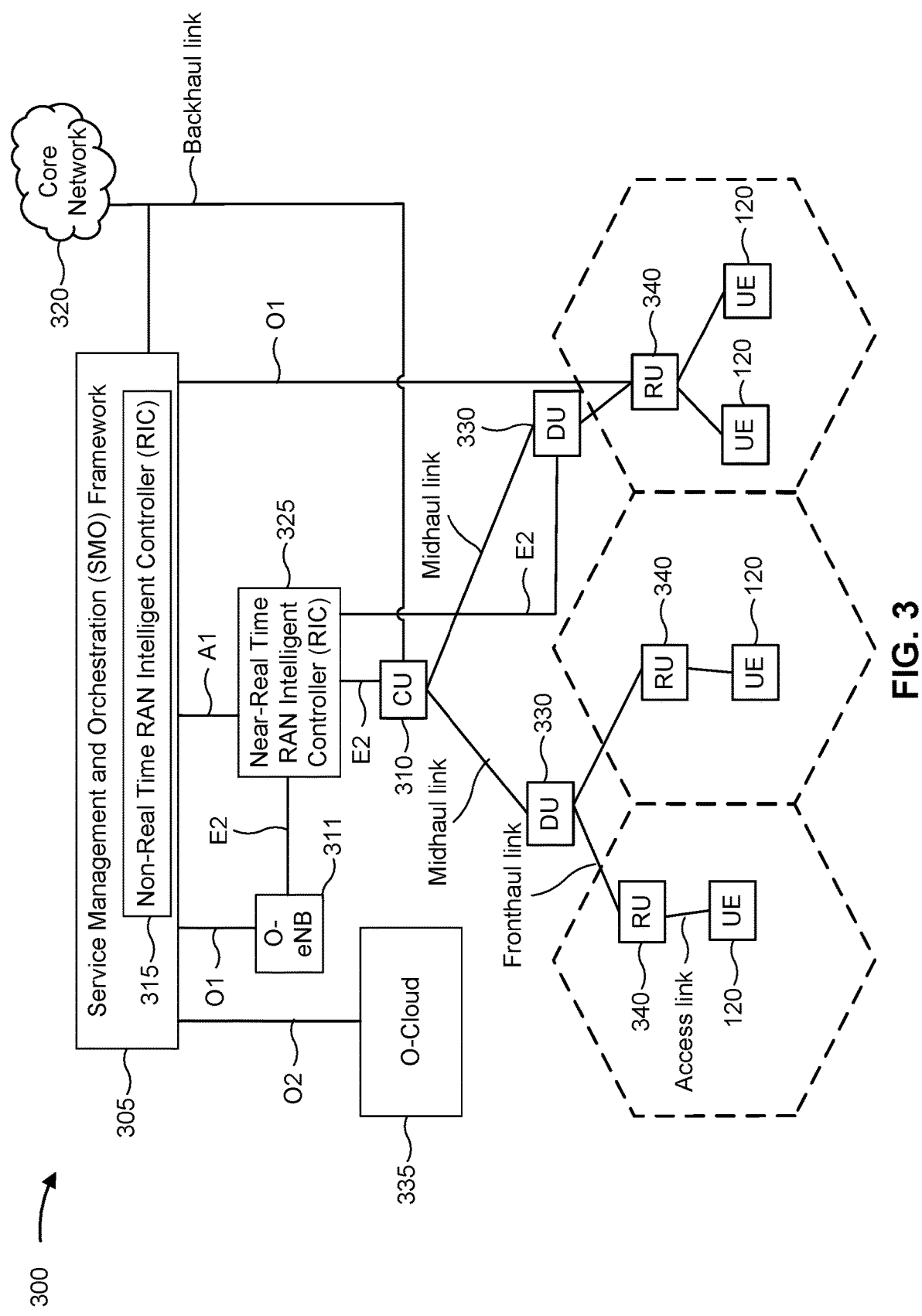
FIG. 3 is a diagram illustrating an example disaggregated base station architecture, in accordance with the present disclosure.

FIG. 3 is a diagram illustrating an example 300 disaggregated base station architecture, in accordance with the present disclosure.

Deployment of communication systems, such as 5G NR systems, may be arranged in multiple manners with various components or constituent parts. In a 5G NR system, or network, a network node, a network entity, a mobility element of a network, a RAN node, a core network node, a network element, or a network equipment, such as a base station (BS, e.g., base station 110), or one or more units (or one or more components) performing base station functionality, may be implemented in an aggregated or disaggregated architecture. For example, a BS (such as a Node B (NB), eNB, NR BS, 5G NB, access point (AP), a TRP, a cell, or the like) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more CUs, one or more DUs, or one or more RUs). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual centralized unit (VCU), a virtual distributed unit (VDU), or a virtual radio unit (VRU).

Base station-type operation or network design may consider aggregation characteristics of base station functionality. For example, disaggregated base stations may be utilized in an IAB network, an O-RAN (such as the network configuration sponsored by the O-RAN Alliance), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

The disaggregated base station architecture shown in FIG. 3 may include one or more CUs 310 that can communicate directly with a core network 320 via a backhaul link, or indirectly with the core network 320 through one or more disaggregated base station units (such as a Near-RT MC 325 via an E2 link, or a Non-RT RIC 315 associated with a Service Management and Orchestration (SMO) Framework 305, or both). A CU 310 may communicate with one or more DUs 330 via respective midhaul links, such as an F1 interface. The DUs 330 may communicate with one or more RUs 340 via respective fronthaul links. The RUs 340 may communicate with respective UEs 120 via one or more radio frequency (RF) access links. In some implementations, the UE 120 may be simultaneously served by multiple RUs 340.

Each of the units (e.g., the CUs 310, the DUs 330, the RUs 340), as well as the Near-RT RICs 325, the Non-RT RICs 315, and the SMO Framework 305, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (e.g., Central Unit-User Plane (CU-UP)), control plane functionality (e.g., Central Unit-Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3GPP. In some aspects, the DU 330 may further host one or more low-PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over the air (OTA) communication with one or more UEs 120. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 335) to perform network element life cycle management (such as to instantiate virtualized network elements) via a cloud computing platform interface (such as an O2 interface). Such virtualized network elements can include, but are not limited to, CUs 310, DUs 330, RUs 340 and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via O1) or via creation of RAN management policies (such as A1 policies).

As indicated above, FIG. 3 is provided as an example. Other examples may differ from what is described with regard to FIG. 3.

Figure 4:
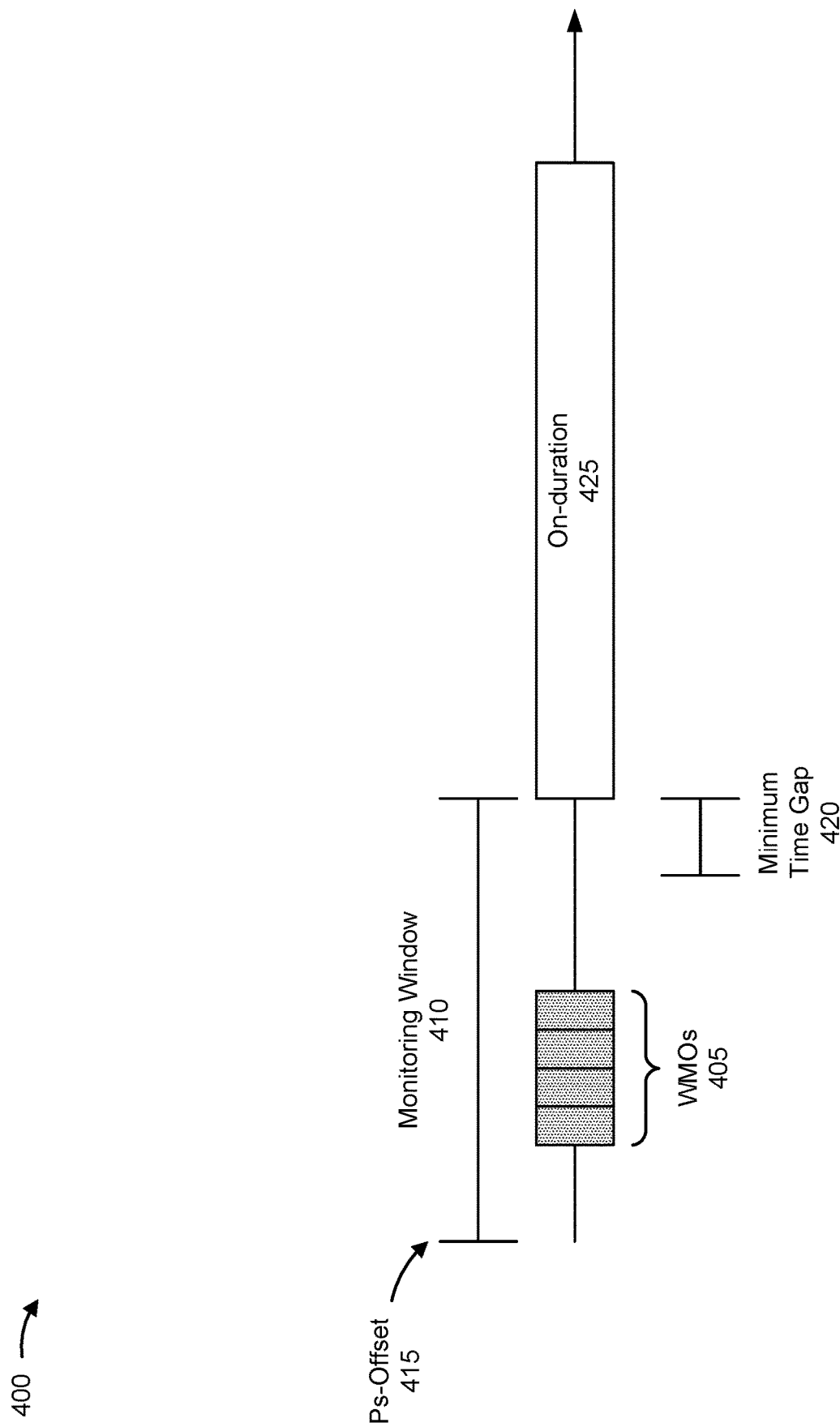
FIGS. 4 and 5 are diagrams illustrating examples of configurations of wake up signals and discontinuous reception (DRX) on-durations, in accordance with the present disclosure.

FIG. 4 is a diagram illustrating an example 400 of a configuration of wake up signals and DRX on-durations, in accordance with the present disclosure. A UE and a network node (e.g., a base station) may communicate using a DRX mode in which the UE monitors for a WUS during one or more WMOs within a monitoring window. If the UE receives a WUS indicating that the UE is to wake up, the UE initiates an on-duration (e.g., a DRX on-duration) at a time that is associated with the monitoring window. In this way, the UE may alternate between sleep modes and on-durations depending on whether the network node has traffic to send to the UE. This may conserve power resources of the UE when compared to remaining in an active mode even when the network node does not have traffic to send to the UE.

As shown in FIG. 4, the UE may monitor one or more WMOs 405 within a monitoring window 410. In this way, the UE is not constantly monitoring for a WUS. The monitoring window 410 may be configured based at least in part on an indication of a ps-Offset 415 that indicates a beginning of the monitoring window 410 that is an amount of time (e.g., a value of the ps-Offset) before an associated on-duration 425 will begin.

The UE may not be expected to monitor WMOs within a gap before the start of the on-duration 425, with the gap having a length equal to an indicated value (e.g., MinTimeGap 420). The value may be associated with a UE capability. For example, the UE may support an indicated value of a number of time (e.g., 3 milliseconds) or a number of RF time domain resources (e.g., 1 slot). WUS monitoring occasions (WMOs) may include time resources in the first $T_s$ slots before a start of the associated on-duration 425 as indicated by an information element (e.g., duration and/or a number of slots) in a search space set configuration. Additionally, or alternatively, $T_s$ may default to a value of 1 slot if a duration is not configured. Locations of monitoring occasions for a search space set may be determined by only a search space set configuration and not relative to timing of the on-duration 425 associated with the WMOs 405.

As indicated above, FIG. 4 is provided as an example. Other examples may differ from what is described with regard to FIG. 4.

Figure 5:
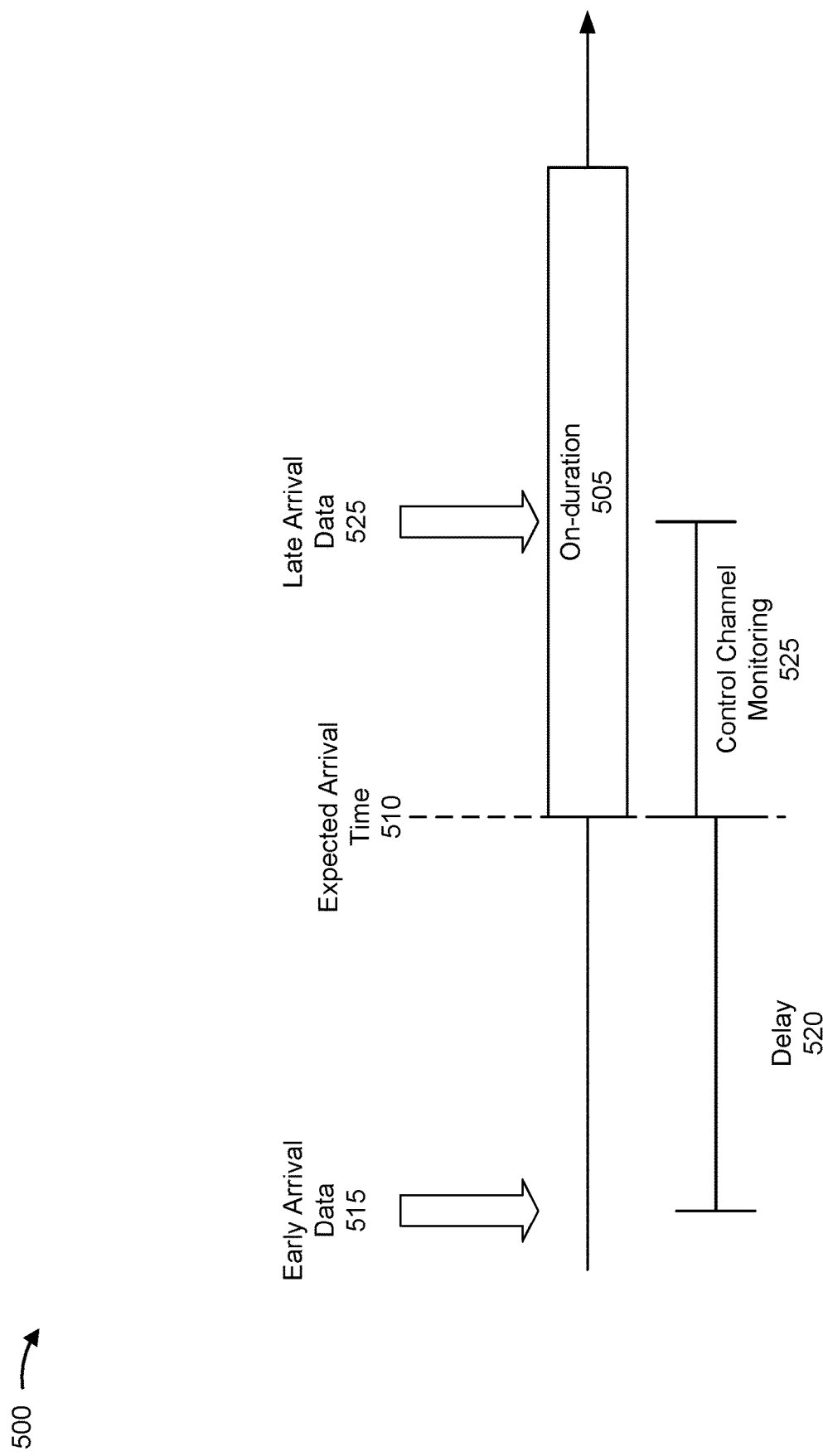

FIG. 5 is a diagram illustrating an example 500 of a configuration of wake up signals and DRX on-durations, in accordance with the present disclosure. Example 500 illustrates use of DRX (e.g., connected mode DRX (CDRX)) when data may arrive at a time that is offset from a starting time of an on-duration.

As shown in FIG. 5, a DRX configuration may indicate that a set of WUSs are associated with an on-duration 505 having a starting time. If a UE is indicated to wake up for the on-duration 505, the UE may expect to begin receiving data at an expected arrival time 510 associated at a beginning of the on-duration 505. For example, if multiple UEs receive an indication to wake up for the on-duration 505, the multiple UEs will all wake up at the expected arrival time 510 and expect to begin receiving data.

As shown in FIG. 5, the data may include early arrival data 515 that arrives (e.g., at the network node) and is ready to be transmitted to the UE before the expected arrival time 510. However, the network node is unable to transmit the early arrival data 515 until the expected arrival time 510 because the UE will not begin to monitor for data until the expected arrival time 510. This may cause delay 520 between a time at which the network node has the early arrival data 515 ready to transmit and a time at which the UE is ready to receive the early arrival data 515 (e.g., the expected arrival time 510). This may cause latency that may disrupt communications between the network node and the UE. For example, when the communications include extended reality (XR) data and/or a video stream, the XR data and/or the video stream may be disrupted with failed frames (e.g., failed based at least in part on the delay 520).

As shown in FIG. 5, the data may include late arrival data 525 that arrives (e.g., at the network node) and is ready to be transmitted to the UE after the expected arrival time 510. In this case, the UE will begin to monitor for data at the expected arrival time 510, but the UE will unnecessarily consume power resources to monitor for the data before the data is ready to be transmitted. In some networks, the UE may monitor a control channel (e.g., for an indication of resources for receiving the data) until the data is ready to be transmitted.

As indicated above, FIG. 5 is provided as an example. Other examples may differ from what is described with regard to FIG. 5.

As described herein, DRX configurations with a fixed starting time may cause communication errors based at least in part on delays and/or may cause unnecessary consumption of power resources to monitor for data before the data is ready for transmission by a network node. Aspects described herein provide a flexible starting time for a DRX on-duration that is based at least in part on a timing of a WMO, within a set of WMOs, during which a WUS is received. As compared to a fixed starting time of a DRX on-duration, this flexible starting time of the DRX on-duration may reduce delays for early arrival data (e.g., by allowing the DRX on-duration to start earlier than a reference time) and/or reduce power consumption for late arrival data (e.g., by allowing the DRX on-duration to start later than a reference time).

In some aspects described herein, a UE may initiate a DRX on-duration at a time that is based at least in part on timing of a WMO, within a set of WMOs, that indicates that the UE is to wake up. In some examples, a DRX on-duration associated with the set of WMOs may have a nominal start as a reference time. The nominal start may be an expected start of the DRX on-duration without an offset. An offset may be unnecessary if there is no jitter. Traffic may have jitter when the traffic has an uncertain traffic arrival time or has an arrival time that is not based on timing (e.g., numerology) of a wireless network through which the traffic is to be transmitted (e.g., timing of the arrival time and timing of slots, subframes, or frames do not always align). For example, XR data may have jitter based at least in part on video frame rates (e.g., refresh rates) being defined in Hz (e.g., 60 Hz, 90 Hz, 120 Hz, among other examples) and a numerology of a wireless network defining frames of 10 milliseconds, subframes of 1 millisecond, and/or slots of 1 millisecond, 500 microseconds, or 250 microseconds. Based at least in part on the UE initiating a DRX on-duration with an offset from the nominal time, the UE and the network node may account for jitter in the traffic. In some aspects, the UE may use the nominal start to derive a window of WMOs for the UE to detect a WUS. For example, the network node may indicate a start time of the window of WMOs relative to the nominal start.

The DRX on-duration may also have an actual start time. The actual start time may be adjusted from the nominal start time to account for a jitter effect and may be derived based at least in part on a UE WUS detection result (e.g., a time of receiving the WUS). The UE initiates the DRX on-duration (e.g., with a duration of time that is defined by an RRC configured information element, such as drx-onDurationTimer) at the actual start time after the UE is indicated to wake up by the WUS. The drx-onDurationTimer may specify an amount of time at a beginning of DRX cycles (e.g., occasions of a DRX ON) to decode a control channel communication (e.g., a physical downlink control channel (PDCCH) communication) during DRX cycles before entering a power saving mode (e.g., DRX OFF). A start of the DRX on-duration is a time when the UE starts to run the drx-onDurationTimer, (e.g., a start of the on-duration is a start of drx-onDurationTimer).

In some aspects described herein, a starting location of a WUS occasion may be determined relative to a nominal start of the DRX on-duration. The WUS occasion (WUS-O) is a set of WMOs associated with a same DRX on-duration for the UE. A single WUS may not be transmitted across WMOs. If a WUS includes a PDCCH communication, each WMO may correspond to a PDCCH monitoring occasion (PMO).

To combat jitter, the UE may monitor for the WUS on multiple WMOs starting at different time instants. An interval between adjacent WMOs may reflect a timing resolution of jitter handling by WUSs. In some aspects, WUSs may be transmitted consecutively or inconsecutively within the WUS-O, which may provide additional benefit of shorter latency and/or lower power consumption to monitor the WUSs.

Based at least in part on the UE being configured to wake up at one of a set of candidate on-duration times that are offset from the nominal start time, the UE may receive data with a reduced delay, which may reduce communication errors (e.g., for XR data and/or video streams). Additionally, or alternatively, the UE may delay initiation of the DRX on-duration to account for late arrival data, which may conserve power resources of the UE that may have otherwise been consumed by initiating the DRX on-duration time at the nominal start time of the DRX on-duration.

In some aspects, a WUS-O is a window that contains the set of WMOs associated with a DRX cycle. A start location of the WUS-O may be configured by a network (e.g., via the network node) by reusing ps-Offset as an offset relative to the nominal start of the DRX on-duration. This offset can have positive values, negative values, or a zero value as the offset from the reference time (e.g., the nominal start of drx-onDurationTimer). In this way, the reference time may not be an actual time for UE to starting monitoring data scheduling PDCCH for a data communication. An end location of the WUS-O may be configured by another offset (e.g., ps-Offset1) relative to the nominal start of DRX on-duration or relative to the offset for the start location. In some aspects, the other offset may be zero if not configured or indicated by the network. The other offset may also be positive or negative and may be smaller than the offset of the start location. In some aspects, if ps-Offset is positive, ps-Offset1 may be zero and not explicitly configured. In some aspects, ps-Offset and ps-Offset1 may be tight boundaries for the window where WUS-O is monitored, which may conserve power resources of the UE that may have otherwise been consumed by monitoring a larger window.

In some aspects, the actual start time may be offset from an end of a first WMO with a detected WUS that indicates the UE to wake up, with the offset based at least in part on an indication from the network and/or based at least in part on a UE capability (e.g., MinTimeGap).

For example, there may be three WMOs in the WUS-O on consecutive slots. UEs 1 to 3 may have a same nominal start of the DRX on-duration, but based at least in part on different jitter time, an earliest WUS that indicates each of the UE to wake up is different from the others. This may lead to different actual start times of the DRX on-duration.

As described, different UEs may have different jitter length (e.g., based at least in part on an amount of data or source of data). An earliest location where a WUS may be transmitted for a UE to wake up may be different for different UEs. Since WUS (e.g., downlink control information (DCI) format 2_6) is a group common PDCCH that can be shared with more than one UE, it is possible that on multiple WMOs before the nominal DRX on-duration, these UEs may not be indicated to wake up synchronously due to different jitter. As described herein, WUSs received on different WUS monitoring occasions associated with the same DRX cycle may have different wake up indication bit values for a UE.

In some aspects, a UE may be indicated to wake up by WUS at only one WMO. In some aspects, once a WUS is detected at one WMO indicating the UE to wake up, WUSs detected on subsequent WMOs after the one WMO may be expected to also indicate this UE to wake up. For example, the UE may be configured with a 4th bit in a WUS PDCCH for its wake up indication. At a second WMO in the WUS-O, this UE may be indicated to wake up for the next DRX on-duration, but the other UEs that share this WUS are not indicated to wake up. A third and fourth WMO in the WUS-O may also indicate that the UE is to wake up for the next DRX on-duration.

In some aspects, the WUS may be transmitted sparsely (e.g., with a threshold periodicity). In some aspects, the WUS may be a non-data scheduling DCI (e.g., DCI format 2_6). Detection of the WUS may trigger search space set group (SSSG) switching. For example, the UE may not be configured to monitor another DCI format when the UE monitors for the WUS, (e.g., based at least in part on the WUS being configured in an SSSG with only the WUS monitoring and no data scheduling PDCCH monitoring to reduce PDCCH monitoring efforts). This may be preferable for WMOs configured to be monitored after the nominal start for the DRX on-duration. Once the WUS is detected, the detection triggers the UE to switch to another SSSG. Data scheduling DCI may be configured in SSSG to which the UE switched so that UE can start to receive DL data.

Since different WUS PDCCHs transmitted on different WMOs associated with the same DRX cycle may have different contents due to different jitter duration for different UEs, the WUS may be defined as a UE-specific PDCCH cyclic prefix check (CRC) scrambled by a UE-specific radio network temporary identifier (RNTI) such as the cell RNTI (C-RNTI), which carries a wake up indication for one UE (not group common). In this way, the WUS may be transmitted only once on WMOs or multiple times on WMOs, but with a consistent wake up indication.

Alternatively, the wake-up indication function of the WUS may be replaced by a UE specific data scheduling DCI. For example, the monitoring window (corresponding to one or more WUS-O(s)) for this DCI may follow a determination of the one or more WUS-Os according to offsets, such as ps-Offset and ps-Offset1 in a WUS configuration. In some aspects, a rule to determine structures of PMOs for the DCI may follow that for the one or more WUS-Os. The UE may monitor the UE specific data scheduling DCI to detect the actual start of the DRX on-duration if UE group based WUS (e.g., DCI format 2_6) is not configured for an active bandwidth part (BWP). In some aspects, the DCI may simultaneously schedule the UE to receive DL data. In some networks, the network may configure a DCI format and search space set for this DCI.

Figure 6:
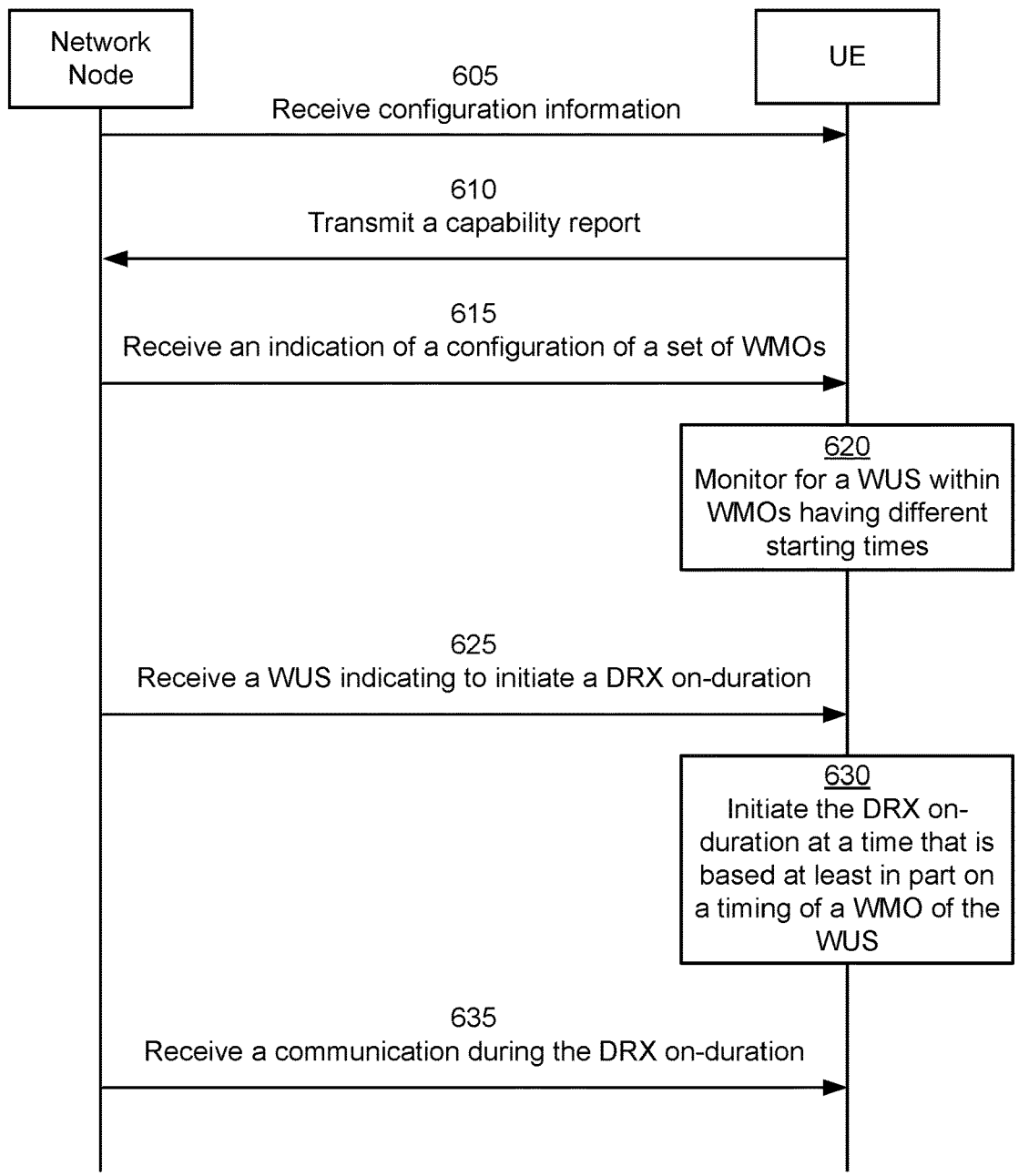
FIGS. 6-7E are diagrams illustrating examples associated with wake up signal monitoring occasions, in accordance with the present disclosure.

FIG. 6 is a diagram of an example 600 associated with WMOs, in accordance with the present disclosure. As shown in FIG. 6, a network node (e.g., base station 110, a CU, a DU, and/or an RU) may communicate with a UE (e.g., UE 120). In some aspects, the network node and the UE may be part of a wireless network (e.g., wireless network 100). The UE and the network node may have established a wireless connection prior to operations shown in FIG. 6. In some aspects, the UE may be configured in a DRX mode. In some aspects, the UE may be configured to receive one or more XR communications and/or a data stream from the network node while in the DRX mode.

As shown by reference number 605, the network node may transmit, and the UE may receive, configuration information. In some aspects, the UE may receive the configuration information via one or more of RRC signaling, one or more MAC control elements (CEs), and/or DCI, among other examples. In some aspects, the configuration information may include an indication of one or more configuration parameters (e.g., already known to the UE and/or previously indicated by the network node or other network device) for selection by the UE, and/or explicit configuration information for the UE to use to configure the UE, among other examples.

In some aspects, the configuration information may indicate that the UE is to transmit a capability to communicate in a DRX mode with a DRX on-duration that begins at a time that based at least in part on timing of a WMO that carries an associated WUS.

The UE may configure itself based at least in part on the configuration information. In some aspects, the UE may be configured to perform one or more operations described herein based at least in part on the configuration information.

As shown by reference number 610, the UE may transmit, and the network node may receive, a capabilities report. In some aspects, the capabilities report may indicate UE support for communicating in a DRX mode with a DRX on-duration that begins at a time that based at least in part on timing of a WMO that carries an associated WUS. In some aspects, the capabilities report may indicate a capability to initiate a DRX on-duration. For example, the capabilities report may indicate a minimum time gap from receiving a WUS indicating to wake up to initiating a DRX on-duration (e.g., (e.g., MinTimeGap 420).

As shown by reference number 615, the UE may receive, and the network node may transmit, an indication of a configuration of a set of WMOs. In some aspects, the configuration may apply to multiple DRX on-duration occasions. For example, the configuration may apply to all DRX on-duration occasions until transmission of an update to the configuration or until the configuration expires (e.g., after a number of DRX on-duration occasions or after an amount of time, among other examples). In some aspects, the UE may receive an indication of a reference time (e.g., nominal start)

of a DRX on-duration occasion in connection with receiving the indication of the configuration of the set of WMOs. For example, the UE may receive a single configuration message (e.g., an RRC message) that indicates the configuration of the reference time and the configuration of the set of WMOs. Alternatively, the UE may receive separate configuration messages associated with the configuration of the reference time and associated with the configuration of the set of WMOs.

In some aspects, the configuration may indicate a mapping of different WMOs having different start times and different start times for DRX on-duration. Each WMO may correspond to a respective start time for DRX on-duration. In some aspects, the configuration may be associated with and/or indicate an offset of an earliest WMO of the set of WMOs relative to a reference start time of a DRX on-duration occasion, an offset of a latest WMO of the set of WMOs relative to the reference start time of a DRX on-duration occasion, a number of WMOs of the set of WMOs, and/or a mapping from the timing of the WMO to the time for initiating the DRX on-duration, among other examples.

In some aspects, receiving the indication of the configuration may include receiving an indication of a timing of the set of WMOs. For example, the configuration may indicate a first offset from a reference time of a DRX on-duration occasion, the first offset indicating an earliest WMO, a second offset from the reference time of the DRX on-duration occasion, the second offset indicating a latest WMO, a third offset from the latest WMO, the third offset indicating the earliest WMO, and/or a fourth offset from the earliest WMO, the fourth offset indicating the latest WMO, among other examples. In some aspects, the first offset and/or the second offset may be a zero-value offset or a negative-value offset. For example, the earliest WMO and/or the latest WMO may occur after the reference time (e.g., the nominal start time) of the DRX on-duration occasion.

In some aspects, the set of WMOs may include multiple clusters of WMOs. For example, the multiple clusters may include a first cluster and a second cluster, with the first cluster separated from the second cluster by one or more time resources. The first cluster may be separated from the second cluster based at least in part on a cluster periodicity associated with timing of first WMOs of the first cluster and the second cluster and/or a difference between an indicated end time associated with the first cluster and an indicated start time associated with the second cluster, among other examples.

As shown by reference number 620, the UE may monitor for the WUS within WMOs having different start times. In some aspects, the different starting times may be based at least in part on a timing resolution of initiating the DRX on-duration by the UE. For example, the different starting times may be based at least in part on the capability report described in connection with reference number 610.

In some aspects, two or more of the multiple WMOs include the WUS. For example, a single WUS associated with the UE may be included in multiple WMOs. In this aspects, the time to initiate the DRX on-duration may be based at least in part on a first timing of an earliest WMO that includes the WUS indicating the UE to wake up, a second timing of a latest WMO that includes the WUS indicating the UE to wake up, or a third timing associated with at least two WMOs that include the WUS indicating the UE to wake up, among other examples. In some aspects, after an earliest WMO that includes the WUS, each WMO of the set of WMOs includes the WUS indicating that the UE is to wake up. For example, subsequent WMOs of the set of WMOs also include the indicate to wake up.

In some aspects, the set of WMOs include consecutive time resources without intervals between adjacent time resources. In some aspects, the set of WMOs include non-consecutive time resources with intervals between adjacent time resources. In some aspects, the intervals may be based at least in part on a WMO configuration (e.g., as described in connection with reference number 615 and/or 605).

As shown by reference number 625, the UE may receive, and the network node may transmit, an WUS indicating to initiate a DRX on-duration. For example, the UE may receive the WUS within a WMO of a set of WMOs. The WMO may be associated with an offset from a reference time for initiating the DRX on-duration. For example, the UE may receive the WMO at a time that maps to the offset from the reference time of a DRX on-duration occasion associated with the set of WMOs.

In some aspects, the WUS may include a UE group-based DCI message, a non-data-scheduling DCI message, and/or a UE-specific control message, among other examples.

As shown by reference number 630, the UE may initiate the DRX on-duration at a time that is based at least in part on a timing of a WMO of the WUS (e.g., the WMO during which the UE received the WUS). In some aspects, the time of initiating the DRX on-duration may be offset from an additional time of receiving the WUS. For example, the time of initiating the DRX on-duration may be required to be a minimum time from receiving the WUS. This may be based at least in part on a capability of the UE (e.g., a minimum time gap to configure the UE to receive during the DRX on-duration) or an indication from the network node (e.g., a configuration that is based at least in part on an indication of the minimum time gap 420). The time for initiating the DRX on-duration may be associated with an offset from the WUS as indicated by the network node (e.g., in connection with reference number 605 and/or 615) and/or may have a minimum offset that is based at least in part on a capability of the UE (e.g., as indicated in connection with reference number 610).

As shown by reference number 635, the UE may receive a communication during the DRX on-duration. For example, the UE may receive XR data and/or a video stream during the DRX on-duration based at least in part on initiating the DRX on-duration at the time associated with the WMO of the WUS.

Based at least in part on the UE being configured to wake up at one of a set of candidate on-duration times that are offset from the nominal start time, the UE may receive data with a reduced delay, which may reduce communication errors (e.g., for XR data and/or video streams). Additionally, or alternatively, the UE may delay initiation of the DRX on-duration to account for late arrival data, which may conserve power resources of the UE that may have otherwise been consumed by initiating the DRX on-duration time at the nominal start time of the DRX on-duration.

As indicated above, FIG. 6 is provided as an example. Other examples may differ from what is described with respect to FIG. 6.

FIGS. 7A-7E are diagrams illustrating examples 700A-700E associated with wake up signal monitoring occasions, in accordance with the present disclosure. As described in connection with FIGS. 7A-7E, a network node (e.g., base station 110, a CU, a DU, and/or an RU) may communicate with a UE (e.g., UE 120). In some aspects, the network node and the UE may be part of a wireless network (e.g., wireless network 100). The UE and the network node may have established a wireless connection prior to operations shown in FIGS. 7A-7C. In some aspects, the UE may be configured in a DRX mode. In some aspects, the UE may be configured to receive one or more XR communications and/or a data stream from the network node while in the DRX mode.

Figure 7A:
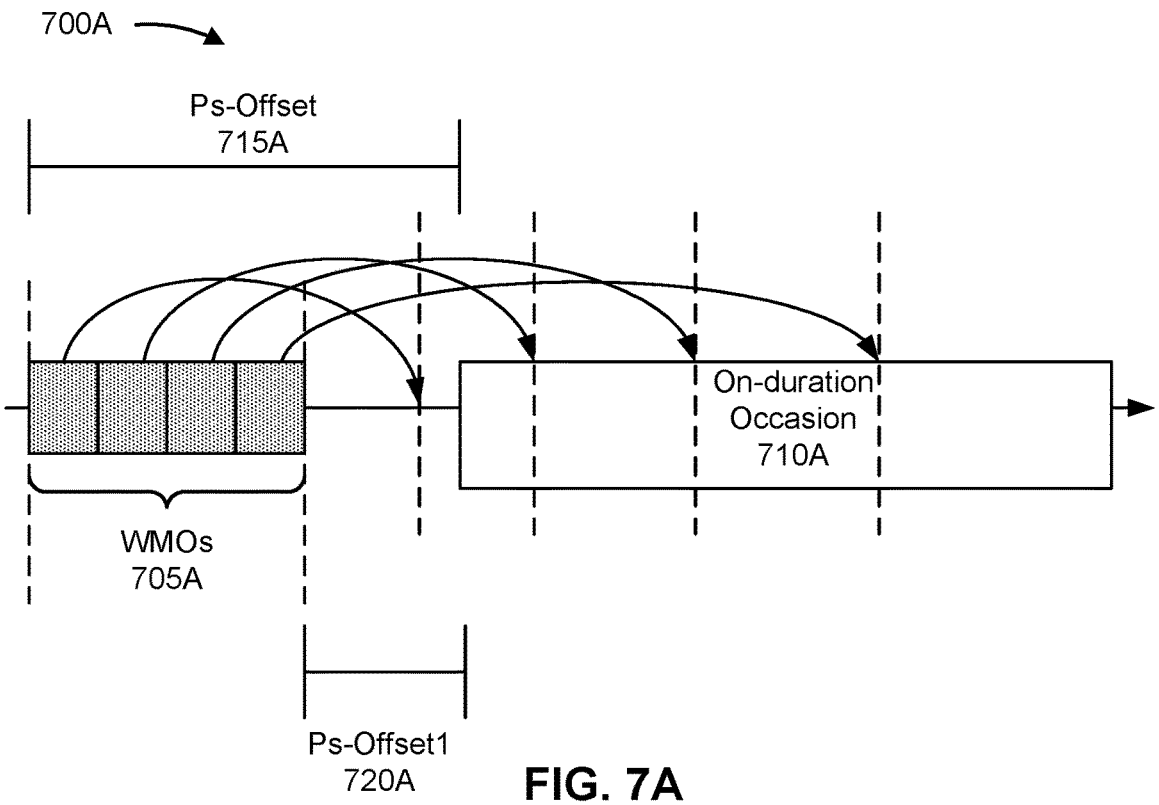

As shown in FIG. 7A, a set of WMOs 705A may be associated with an on-duration occasion having a nominal start time. The set of WMOs 705A may include a set of consecutive downlink symbols in slots without overlap between WMOs. In some aspects, WMOs of the set of WMOs 705A may map to different actual start times of DRX on-durations. For example, the WMOs may map to actual start times that are offset from the nominal start time of the on-duration occasion 710A. The actual start times may be before or after the nominal start time as illustrated in FIG. 7A. Additionally, an actual start time may be at the same time as the nominal start time. For example, one of the actual start times corresponding to a WMO may not be offset (e.g., an offset of 0) from the nominal start time while other start times corresponding to other WMOs may be offset from the nominal start time.

A window for monitoring the set of WMOs 705A may be configured using an indication of a ps-Offset 715A associated with an earliest WMO of the set of WMOs 705A and a ps-Offset1 720A associated with a latest WMO of the set of WMOs 705A.

Figure 7B:
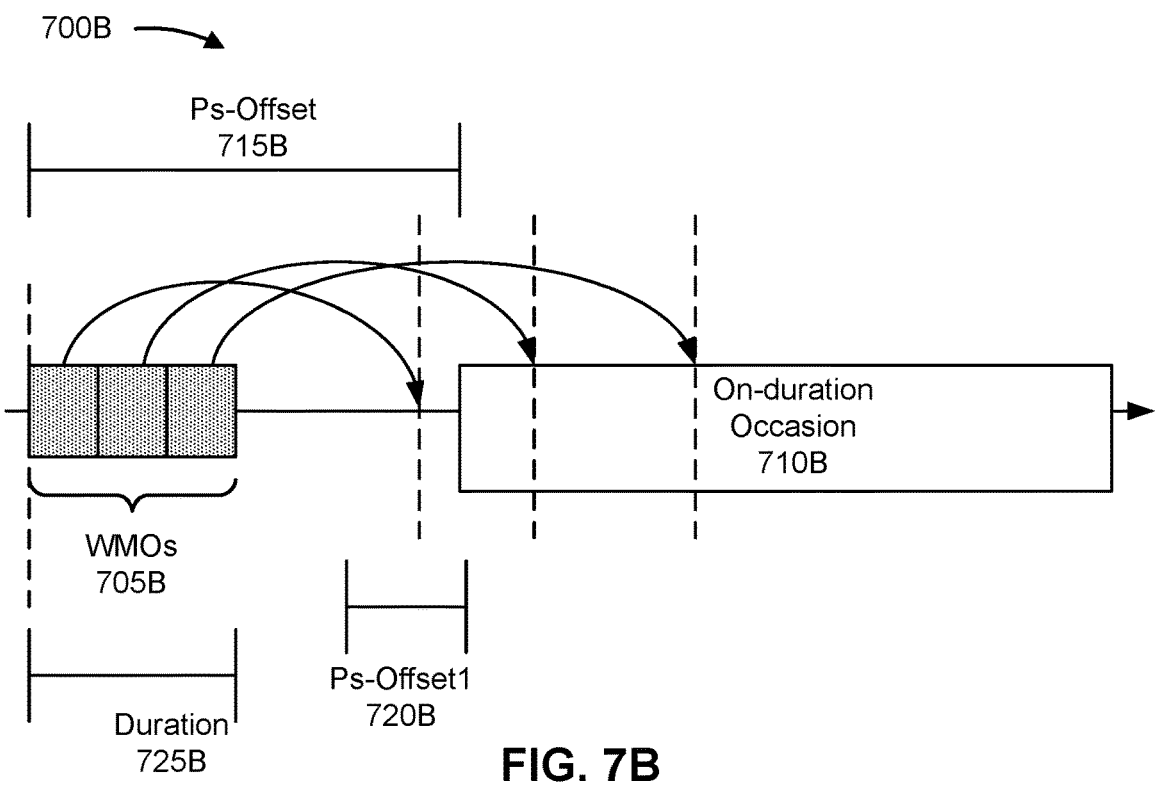

As shown in FIG. 7B, a set of WMOs 705B may be associated with an on-duration occasion having a nominal start time. The set of WMOs 705B may include a set of consecutive downlink symbols in slots without overlap between WMOs. As described in connection with FIG. 7A, WMOs of the set of WMOs 705B may map to different actual start times of DRX on-durations. For example, the WMOs may map to actual start times that are offset from the nominal start time of the on-duration occasion 710B.

A window for monitoring the set of WMOs 705B may be configured using an indication of a ps-Offset 715B associated with an earliest WMO of the set of WMOs 705A and a duration 725B associated with a length of time from the earliest WMO to a latest WMO of the set of WMOs 705A. The duration 725B may indicate that the latest WMO ends before a ps-Offset1 720B, if indicated. In some aspects, the duration 725B may be set to 1, if not configured or indicated.

Figure 7C:
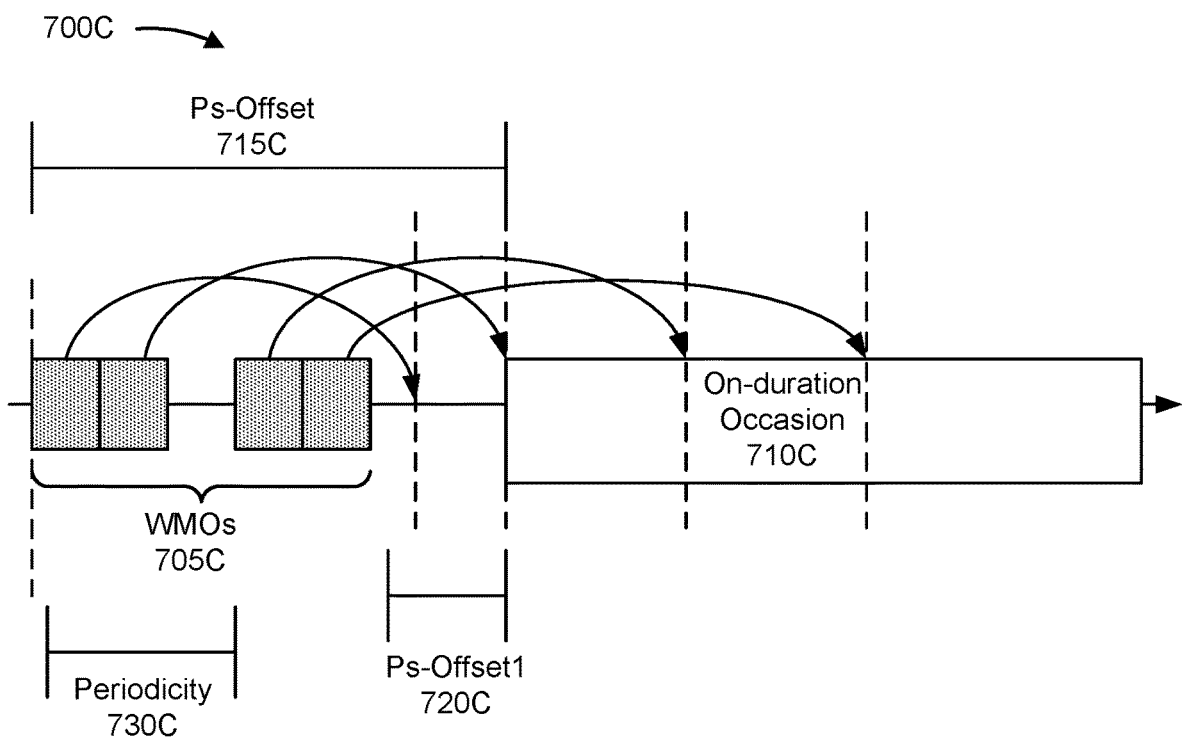

As shown in FIG. 7C, a set of WMOs 705C may be associated with an on-duration occasion having a nominal start time. The set of WMOs 705C may include set of downlink symbols in slots without overlap between WMOs. The set of WMOs 705C may include a first cluster of consecutive WMOs and a second cluster of consecutive WMOs that are spaced by a time interval. As described in connection with FIG. 7A, WMOs of the set of WMOs 705C may map to different actual start times of DRX on-durations. For example, the WMOs may map to actual start times that are offset from the nominal start time of the on-duration occasion 710C.

A window for monitoring the set of WMOs 705C may be configured using an indication of a ps-Offset 715C associated with an earliest WMO of the set of WMOs 705C and a periodicity 730C that indicates an offset of a start of the second cluster of the WMOs from a start of the first cluster of the WMOs. The periodicity may indicate that the latest WMO of the second cluster ends before a ps-Offset1 720C, if indicated. In some aspects, each cluster may include T_s slots indicated by a duration. In interval (e.g., start to start or end to end) between clusters may be equal to a periodicity as indicated (e.g., in an RRC information element, such as monitoringSlotPeriodicityAndOffset) of a search space set configuration.

Based at least in part on using multiple clusters of WMOs, the WMOs may be sparser than those described in connection with FIGS. 7A and 7B. This may reduce power consumption and/or provide a greater range of times to initiate the DRX on-duration to account for jitter in downlink communications.

Figure 7D:
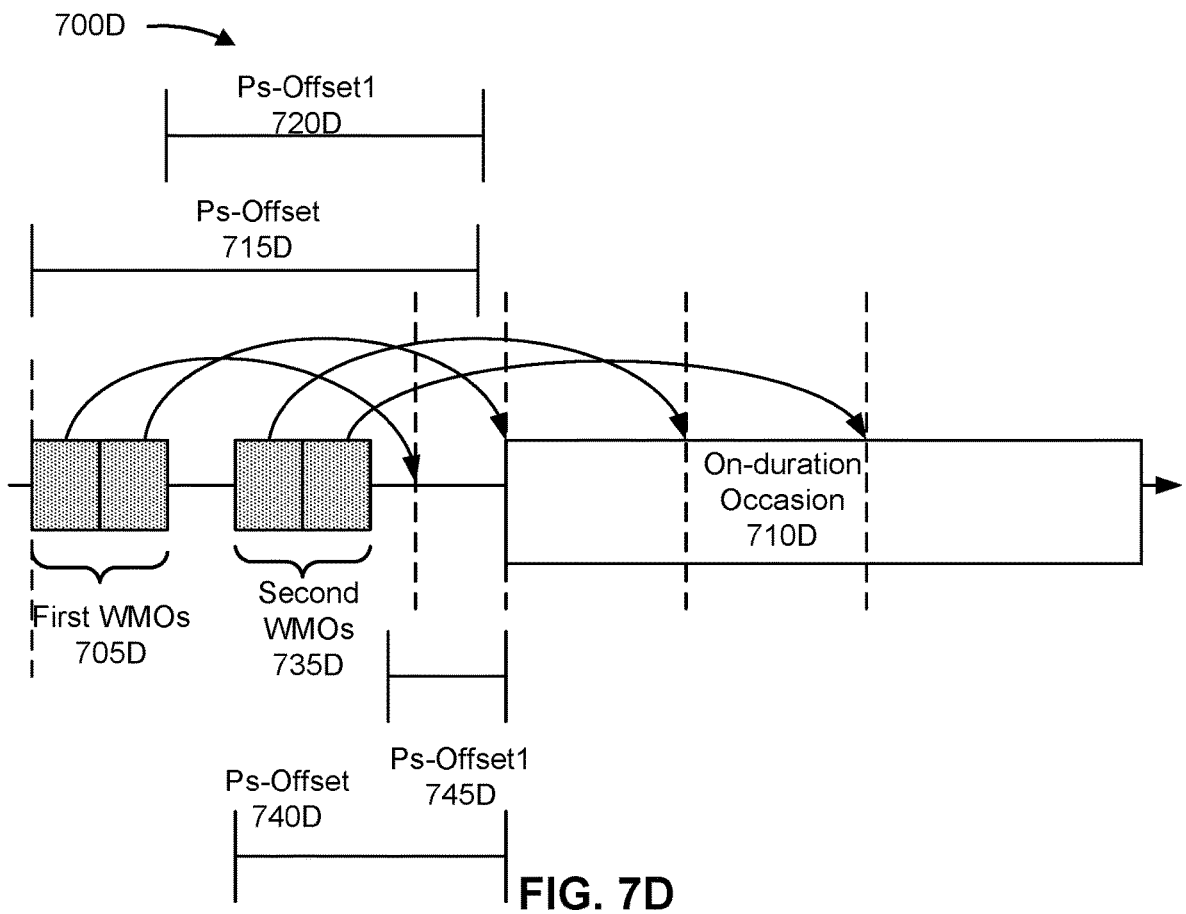

As shown in FIG. 7D, a first set of WMOs 705D may be associated with an on-duration occasion having a nominal start time. The first set of WMOs 705D may include a set of consecutive downlink symbols in slots without overlap between WMOs. As described in connection with FIG. 7A, WMOs of the first set of WMOs 705D may map to different actual start times of DRX on-durations. For example, the WMOs may map to actual start times that are offset from the nominal start time of the on-duration occasion 710D.

A window for monitoring the first set of WMOs 705D may be configured using an indication of a ps-Offset 715D associated with an earliest WMO of the first set of WMOs 705A and a ps-Offset1 720D associated with a latest WMO of the first set of WMOs 705A.

As further shown in FIG. 7D, a second set of WMOs 735D may be associated with an on-duration occasion having a nominal start time. The second set of WMOs 735D may include a set of consecutive downlink symbols in slots without overlap between WMOs. As described in connection with FIG. 7A, WMOs of the second set of WMOs 735D may map to different actual start times of DRX on-durations. For example, the WMOs may map to actual start times that are offset from the nominal start time of the on-duration occasion 710D.

A window for monitoring the first set of WMOs 705D may be configured using an indication of a ps-Offset 740D associated with an earliest WMO of the second set of WMOs 735D and a ps-Offset1 745D associated with a latest WMO of the second set of WMOs 735D.

Based at least in part on using multiple sets of WMOs, the WMOs may be sparser than those described in connection with FIGS. 7A and 7B. This may reduce power consumption and/or provide a greater range of times to initiate the DRX on-duration to account for jitter in downlink communications.

Figure 7E:
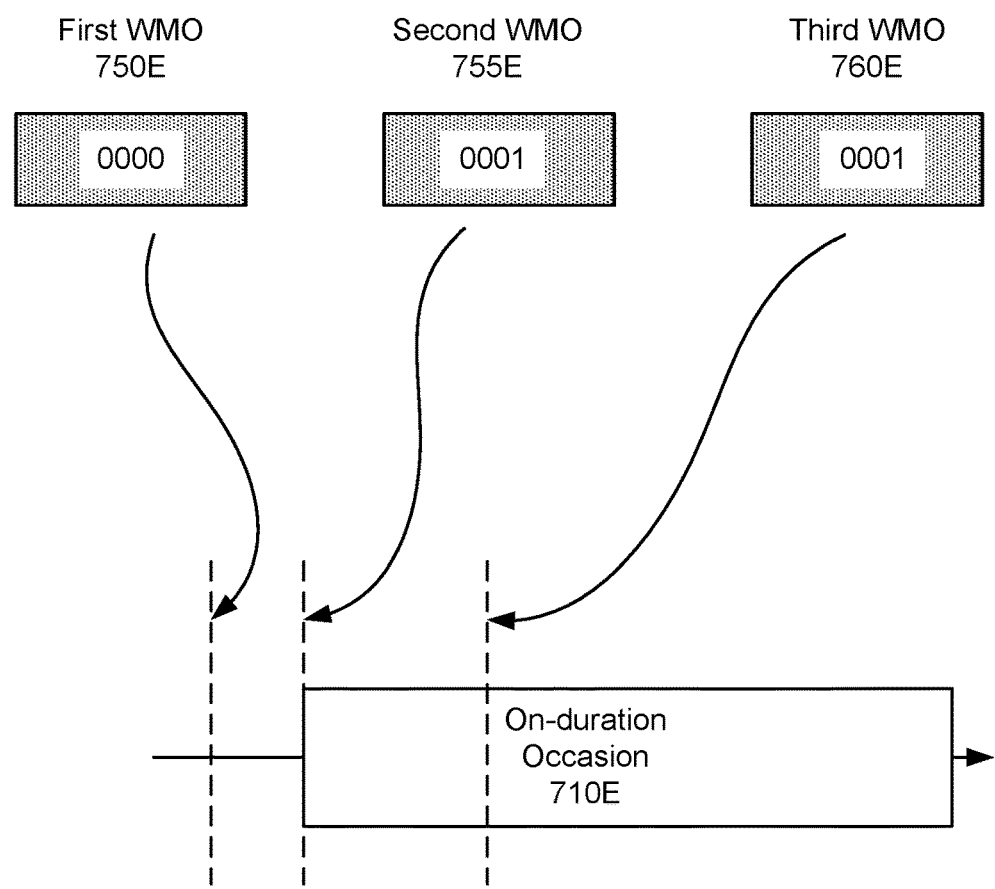

As shown in FIG. 7E, a set of WMOs may include a first WMO 750E, a second WMO 755E, and a third WMO 760E. The set of WMO having three WMOs is provided for illustrative purposes and may alternatively have any number of WMOs. For example, a set of WMOs may include a different number of WMOs (e.g., two WMOs or 3 or more WMOs) in the context of the description of FIG. 7E.

The first WMO 750E maps to a first start time for DRX on-duration (e.g., having a first offset from an on-duration occasion 710E), the second WMO 755E maps to a second start time for DRX on-duration (e.g., having a second offset from the on-duration occasion 710E), and the third WMO 760E maps to a third start time for DRX on-duration (e.g., having a third offset from the on-duration occasion 710E). In some aspects, the WMOs 750E, 755E, 760E are associated with a same DRX cycle and/or the same on-duration occasion 710E.

The WMOs 750E, 755E, 760E may have multiple wake up indications using, for example, a bit map with different wake up bit values for different UEs. In some aspects, a WUS may indicate that a UE is to wake up at only one WMO. In some aspects, a WUS may first indicate that a UE is to wake up at one WMO and then may also indicate that the UE is to wake up with WUSs at subsequent WMOs (e.g., each WMO after the one WMO that includes the initial indication for the UE to wake up).

As shown in FIG. 7E, a first UE may be associated with a first bit of the WMOs 750E, 755E, 760E and may not be indicated to wake up. Similarly, a second UE may be associated with a second bit of the WMOs 750E, 755E, 760E and a third UE may be associated with a third bit of the WMOs 750E, 755E, 760E, each of which may not be indicated to wake up. A fourth UE may be associated with a fourth bit of the WMOs 750E, 755E, 760E and may be indicated in the second WMO 755E to wake up. Based at least in part on being indicated in the second WMO 755E to wake up, the UE may be configured to wake up at the second start time for DRX on-duration (shown for illustration as having a zero value offset from a nominal start time of the on-duration occasion 710E). In some aspects, the fourth UE may also be indicated in the third WMO 755E to wake up based at least in part on a configuration where WMOs subsequent to an initial indication to wake up, also indicate to wake up.

Alternatively to the example shown in FIG. 7E, the third WMO 760E may not include an indication to wake up. Additionally, or alternatively, a DRX on-duration start time for an indicated UE (e.g., the fourth UE) may be associated with (e.g., mapped to) a last WMO that indicates to wake up. For example, the first WMO 750E and the second WMO 755E may indicate that the UE is to wake up and the third WMO 760E may not indicate that the UE is to wake up. This may indicate that the UE is to initiate DRX on-duration at a time that maps to the second WMO 755E based at least in part on the second WMO 755E being a last WMO that indicates to wake up.

As indicated above, FIGS. 7A-7E are provided as examples. Other examples may differ from what is described with respect to FIGS. 7A-7E.

FIG. 8 is a diagram illustrating an example process 800 performed, for example, by a UE, in accordance with the present disclosure. Example process 800 is an example where the UE (e.g., UE 120) performs operations associated with WMOs.

As shown in FIG. 8, in some aspects, process 800 may include receiving a WUS within a WMO indicating to initiate a DRX on-duration, a time to initiate the DRX on-duration being based at least in part on a timing of the WMO within a set of WMOs (block 810). For example, the UE (e.g., using communication manager 140 and/or reception component 1002, depicted in FIG. 10) may receive a WUS within a WMO indicating to initiate a DRX on-duration, a time to initiate the DRX on-duration being based at least in part on a timing of the WMO within a set of WMOs, as described above.

As further shown in FIG. 8, in some aspects, process 800 may include receiving a communication based at least in part on initiating the DRX on-duration at the time (block 820). For example, the UE (e.g., using communication manager 140 and/or reception component 1002, depicted in FIG. 10) may receive a communication based at least in part on initiating the DRX on-duration at the time, as described above.

Process 800 may include additional aspects, such as any single aspect or any combination of aspects described below and/or in connection with one or more other processes described elsewhere herein.

In a first aspect, the set of WMOs are associated with a reference start time, and wherein the time is offset from the reference start time by an amount that is based at least in part on the timing of the WMO within the set of WMOs.

In a second aspect, alone or in combination with the first aspect, the set of WMOs are associated with a single DRX on-duration occasion.

In a third aspect, alone or in combination with one or more of the first and second aspects, process 800 includes receiving an indication of a configuration of the set of WMOs, the configuration being associated with one or more of an offset of an earliest WMO of the set of WMOs relative to a reference start time of a DRX on-duration occasion, an offset of a latest WMO of the set of WMOs relative to the reference start time of a DRX on-duration occasion, a number of WMOs of the set of WMOs, or an indication of a mapping from the timing of the WMO to the time for initiating the DRX on-duration.

In a fourth aspect, alone or in combination with one or more of the first through third aspects, process 800 includes monitoring for the WUS within multiple WMOs having different starting times.

In a fifth aspect, alone or in combination with one or more of the first through fourth aspects, the different starting times are based at least in part on a timing resolution of initiating the DRX on-duration by the UE.

In a sixth aspect, alone or in combination with one or more of the first through fifth aspects, two or more of the multiple WMOs include the WUS, and wherein the time is based at least in part on a first timing of an earliest WMO that includes the WUS indicating the UE to wake up, a second timing of a latest WMO that includes the WUS indicating the UE to wake up, or a third timing associated with at least two WMOs that include the WUS indicating the UE to wake up.

The method of claim 5, wherein, after an earliest WMO that includes the WUS, each WMO of the set of WMOs includes the WUS indicating that the UE is to wake up.

In a seventh aspect, alone or in combination with one or more of the first through sixth aspects, the set of WMOs include non-consecutive time resources with intervals between adjacent time resources that are based at least in part on a WMO configuration.

In an eighth aspect, alone or in combination with one or more of the first through seventh aspects, process 800 includes receiving an indication of a timing of the set of WMOs, wherein the indication comprises one or more of an indication of a first offset from a reference time of a DRX on-duration occasion, the first offset indicating an earliest WMO, an indication of a second offset from the reference time of the DRX on-duration occasion, the second offset indicating a latest WMO, an indication of a third offset from the latest WMO, the third offset indicating the earliest WMO, or an indication of a fourth offset from the earliest WMO, the fourth offset indicating the latest WMO.

In a ninth aspect, alone or in combination with one or more of the first through eighth aspects, one or more of the first offset or the second offset is a zero-value offset or a negative-value offset, and wherein one or more of the earliest WMO or the latest WMO has resources that occur after the reference time of the DRX on-duration occasion.

In a tenth aspect, alone or in combination with one or more of the first through ninth aspects, the time of initiating the DRX on-duration is offset from an additional time of receiving the WUS based at least in part on one or more of an indication of the offset, or a capability of the UE.

In an eleventh aspect, alone or in combination with one or more of the first through tenth aspects, the set of WMOs comprises a first cluster of multiple WMOs and a second cluster of multiple WMOs, the first cluster separated from the second cluster by one or more time resources.

In a twelfth aspect, alone or in combination with one or more of the first through eleventh aspects, the first cluster and the second cluster are separated by the one or more time resources based at least in part on one or more of a cluster periodicity associated with timing of first WMOs of the first cluster and the second cluster, or a difference between an indicated end time associated with the first cluster and an indicated start time associated with the second cluster.

In a thirteenth aspect, alone or in combination with one or more of the first through twelfth aspects, the WUS comprises one or more of a UE group-based DCI message, a non-data-scheduling DCI message, or a UE-specific control message.

In a fourteenth aspect, alone or in combination with one or more of the first through thirteenth aspects, the communication comprises one or more of an XR communication, or a data stream.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

FIG. 9 is a diagram illustrating an example process 900 performed, for example, by a network node, in accordance with the present disclosure. Example process 900 is an example where the network node (e.g., base station 110 and/or one or more device associated with the base station 110, such as a CU, a DU, or an RU, among other examples) performs operations associated with WMOs.

As shown in FIG. 9, in some aspects, process 900 may include transmitting a WUS within a WMO indicating to initiate a DRX on-duration, a time to initiate the DRX on-duration being based at least in part on a timing of the WMO within a set of WMOs (block 910). For example, the network node (e.g., using communication manager 150 and/or transmission component 1104, depicted in FIG. 11) may transmit a WUS within a WMO indicating to initiate a DRX on-duration, a time to initiate the DRX on-duration being based at least in part on a timing of the WMO within a set of WMOs, as described above.

As further shown in FIG. 9, in some aspects, process 900 may include transmitting a communication based at least in part on initiating the DRX on-duration at the time (block 920). For example, the network node (e.g., using communication manager 150 and/or transmission component 1104, depicted in FIG. 11) may transmit a communication based at least in part on initiating the DRX on-duration at the time, as described above.

Process 900 may include additional aspects, such as any single aspect or any combination of aspects described below and/or in connection with one or more other processes described elsewhere herein.

In a first aspect, the set of WMOs are associated with a reference start time, and wherein the time is offset from the reference start time by an amount that is based at least in part on the timing of the WMO within the set of WMOs.

In a second aspect, alone or in combination with the first aspect, the set of WMOs are associated with a single DRX on-duration occasion.

In a third aspect, alone or in combination with one or more of the first and second aspects, process 900 includes transmitting an indication of a configuration of the set of WMOs, the configuration being associated with one or more of an offset of an earliest WMO of the set of WMOs relative to a reference start time of a DRX on-duration occasion, an offset of a latest WMO of the set of WMOs relative to the reference start time of a DRX on-duration occasion, a number of WMOs of the set of WMOs, or an indication of a mapping from the timing of the WMO to the time for initiating the DRX on-duration.

In a fourth aspect, alone or in combination with one or more of the first through third aspects, the set of WMOs comprises one or more additional WMOs having different starting times.

In a fifth aspect, alone or in combination with one or more of the first through fourth aspects, the different starting times are based at least in part on a timing resolution initiating DRX on-duration by one or more connected user equipment.

In a sixth aspect, alone or in combination with one or more of the first through fifth aspects, two or more WMOs of the set of WMOs include the WUS, and wherein the time is based at least in part on a first timing of an earliest WMO that includes the WUS indicating to wake up, a second timing of a latest WMO that includes the WUS indicating to wake up, or a third timing associated with at least two WMOs that include the WUS indicating to wake up.

The method of claim 21, wherein, after an earliest WMO that includes the WUS, each WMO of the set of WMOs includes the WUS indicating that a UE is to wake up.

In a seventh aspect, alone or in combination with one or more of the first through sixth aspects, the set of WMOs include non-consecutive time resources with intervals between adjacent time resources that are based at least in part on a WMO configuration.

In an eighth aspect, alone or in combination with one or more of the first through seventh aspects, process 900 includes transmitting an indication of a timing of the set of WMOs, wherein the indication comprises one or more of an indication of a first offset from a reference time of a DRX on-duration occasion, the first offset indicating an earliest WMO, an indication of a second offset from the reference time of the DRX on-duration occasion, the second offset indicating a latest WMO, an indication of a third offset from the latest WMO, the third offset indicating the earliest WMO, or an indication of a fourth offset from the earliest WMO, the fourth offset indicating the latest WMO.

In a ninth aspect, alone or in combination with one or more of the first through eighth aspects, one or more of the first offset or the second offset is a zero-value offset or a negative-value offset, and wherein one or more of the earliest WMO or the latest WMO has resources that occur after the reference time of the DRX on-duration occasion.

In a tenth aspect, alone or in combination with one or more of the first through ninth aspects, the time of initiating the DRX on-duration is offset from an additional time of receiving the WUS based at least in part on one or more of an indication of the offset, or a capability of a user equipment.

In an eleventh aspect, alone or in combination with one or more of the first through tenth aspects, the set of WMOs comprises a first cluster of multiple WMOs and a second cluster of multiple WMOs, the first cluster separated from the second cluster by one or more time resources.

In a twelfth aspect, alone or in combination with one or more of the first through eleventh aspects, the first cluster and the second cluster are separated by the one or more time resources based at least in part on one or more of a cluster periodicity associated with timing of first WMOs of the first cluster and the second cluster, or a difference between an indicated end time associated with the first cluster and an indicated start time associated with the second cluster.

In a thirteenth aspect, alone or in combination with one or more of the first through twelfth aspects, the WUS comprises one or more of a UE group-based DCI message, a non-data-scheduling DCI message, or a user-equipment-specific control message.

In a fourteenth aspect, alone or in combination with one or more of the first through thirteenth aspects, the communication comprises one or more of an XR communication, or a data stream.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
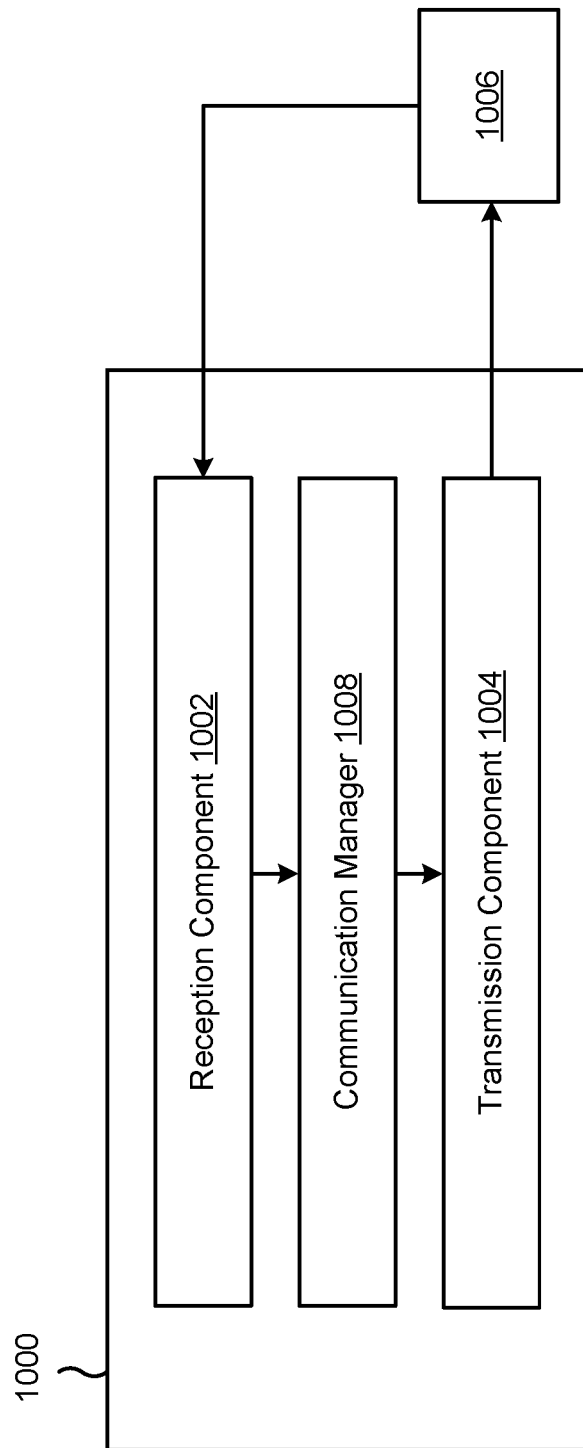
FIGS. 10 and 11 are diagrams of example apparatuses for wireless communication, in accordance with the present disclosure.

FIG. 10 is a diagram of an example apparatus 1000 for wireless communication. The apparatus 1000 may be a UE, or a UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include a communication manager (e.g., the communication manager 140).

In some aspects, the apparatus 1000 may be configured to perform one or more operations described herein in connection with FIGS. 6-7D. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the UE described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the UE described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the UE described in connection with FIG. 2. In some aspects, the transmission component 1004 may be co-located with the reception component 1002 in a transceiver.

The reception component 1002 may receive a WUS within a WMO indicating to initiate a DRX on-duration, a time to initiate the DRX on-duration being based at least in part on a timing of the WMO within a set of WMOs. The reception component 1002 may receive a communication based at least in part on initiating the DRX on-duration at the time.

The reception component 1002 may receive an indication of a configuration of the set of WMOs, the configuration being associated with one or more of an offset of an earliest WMO of the set of WMOs relative to a reference start time of a DRX on-duration occasion, an offset of a latest WMO of the set of WMOs relative to the reference start time of a DRX on-duration occasion, a number of WMOs of the set of WMOs, or an indication of a mapping from the timing of the WMO to the time for initiating the DRX on-duration.

The communication manager 1008 and/or the reception component 1002 may monitor for the WUS within multiple WMOs having different starting times.

The reception component 1002 may receive an indication of a timing of the set of WMOs, wherein the indication comprises one or more of an indication of a first offset from a reference time of a DRX on-duration occasion, the first offset indicating an earliest WMO, an indication of a second offset from the reference time of the DRX on-duration occasion, the second offset indicating a latest WMO, an indication of a third offset from the latest WMO, the third offset indicating the earliest WMO, or an indication of a fourth offset from the earliest WMO, the fourth offset indicating the latest WMO.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
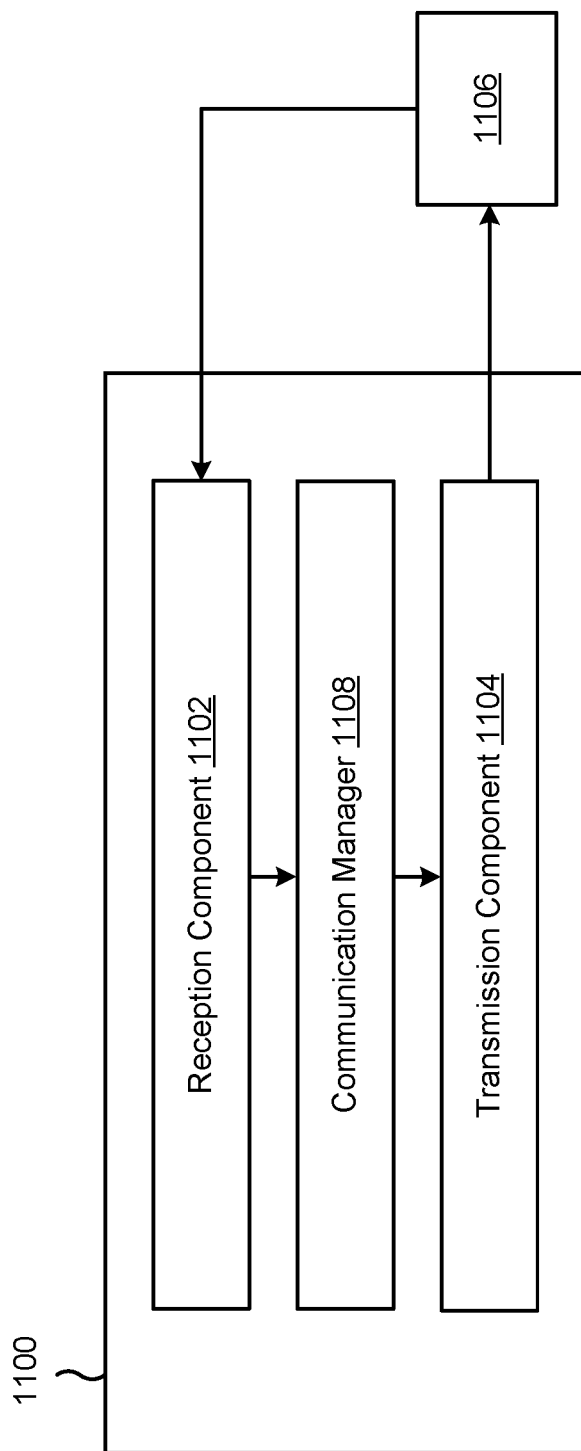

FIG. 11 is a diagram of an example apparatus 1100 for wireless communication. The apparatus 1100 may be a network node, or a network node may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include a communication manager 1108 (e.g., the communication manager 150).

In some aspects, the apparatus 1100 may be configured to perform one or more operations described herein in connection with FIGS. 6-7D. Additionally, or alternatively, the apparatus 1100 may be configured to perform one or more processes described herein, such as process 900 of FIG. 9. In some aspects, the apparatus 1100 and/or one or more components shown in FIG. 11 may include one or more components of the network node described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the network node described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the network node described in connection with FIG. 2. In some aspects, the transmission component 1104 may be co-located with the reception component 1102 in a transceiver.

The transmission component 1104 may transmit a WUS within a WMO indicating to initiate a DRX on-duration, a time to initiate the DRX on-duration being based at least in part on a timing of the WMO within a set of WMOs. The transmission component 1104 may transmit a communication based at least in part on initiating the DRX on-duration at the time.

The transmission component 1104 may transmit an indication of a configuration of the set of WMOs, the configuration being associated with one or more of an offset of an earliest WMO of the set of WMOs relative to a reference start time of a DRX on-duration occasion, an offset of a latest WMO of the set of WMOs relative to the reference start time of a DRX on-duration occasion, a number of WMOs of the set of WMOs, or an indication of a mapping from the timing of the WMO to the time for initiating the DRX on-duration.

The transmission component 1104 may transmit an indication of a timing of the set of WMOs, wherein the indication comprises one or more of an indication of a first offset from a reference time of a DRX on-duration occasion, the first offset indicating an earliest WMO, an indication of a second offset from the reference time of the DRX on-duration occasion, the second offset indicating a latest WMO, an indication of a third offset from the latest WMO, the third offset indicating the earliest WMO, or an indication of a fourth offset from the earliest WMO, the fourth offset indicating the latest WMO.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a user equipment (UE), comprising: receiving a wake up signal (WUS) within a WUS monitoring occasion (WMO) indicating to initiate a discontinuous reception (DRX) on-duration, a time to initiate the DRX on-duration being based at least in part on a timing of the WMO within a set of WMOs; and receiving a communication based at least in part on initiating the DRX on-duration at the time.

Aspect 2: The method of Aspect 1, wherein the set of WMOs are associated with a reference start time, and wherein the time is offset from the reference start time by an amount that is based at least in part on the timing of the WMO within the set of WMOs.

Aspect 3: The method of any of Aspects 1 or 2, wherein the set of WMOs are associated with a single DRX on-duration occasion.

Aspect 4: The method of any of Aspects 1-2, further comprising: receiving an indication of a configuration of the set of WMOs, the configuration being associated with one or more of: an offset of an earliest WMO of the set of WMOs relative to a reference start time of a DRX on-duration occasion, an offset of a latest WMO of the set of WMOs relative to the reference start time of a DRX on-duration occasion, a number of WMOs of the set of WMOs, or an indication of a mapping from the timing of the WMO to the time for initiating the DRX on-duration.

Aspect 5: The method of any of Aspects 1-4, further comprising: monitoring for the WUS within multiple WMOs having different starting times.

Aspect 6: The method of Aspect 5, wherein the different starting times are based at least in part on a timing resolution of initiating the DRX on-duration by the UE.

Aspect 7: The method of any of Aspects 5 or 6, wherein two or more of the multiple WMOs include the WUS, and wherein the time is based at least in part on: a first timing of an earliest WMO that includes the WUS indicating the UE to wake up, a second timing of a latest WMO that includes the WUS indicating the UE to wake up, or a third timing associated with at least two WMOs that include the WUS indicating the UE to wake up.

Aspect 8: The method of any of Aspects 5-7, wherein, after an earliest WMO that includes the WUS, each WMO of the set of WMOs includes the WUS indicating that the UE is to wake up.

Aspect 9: The method of any of Aspects 1-8, wherein the set of WMOs include non-consecutive time resources with intervals between adjacent time resources that are based at least in part on a WMO configuration.

Aspect 10: The method of any of Aspects 1-9, further comprising receiving an indication of a timing of the set of WMOs, wherein the indication comprises one or more of: an indication of a first offset from a reference time of a DRX on-duration occasion, the first offset indicating an earliest WMO, an indication of a second offset from the reference time of the DRX on-duration occasion, the second offset indicating a latest WMO, an indication of a third offset from the latest WMO, the third offset indicating the earliest WMO, or an indication of a fourth offset from the earliest WMO, the fourth offset indicating the latest WMO.

Aspect 11: The method of Aspect 10, wherein one or more of the first offset or the second offset is a zero-value offset or a negative-value offset, and wherein one or more of the earliest WMO or the latest WMO has resources that occur after the reference time of the DRX on-duration occasion.

Aspect 12: The method of any of Aspects 1-11, wherein the time of initiating the DRX on-duration is offset from an additional time of receiving the WUS based at least in part on one or more of: an indication of the offset, or a capability of the UE.

Aspect 13: The method of any of Aspects 1-12, wherein the set of WMOs comprises: a first cluster of multiple WMOs and a second cluster of multiple WMOs, the first cluster separated from the second cluster by one or more time resources.

Aspect 14: The method of Aspect 13, wherein the first cluster and the second cluster are separated by the one or more time resources based at least in part on one or more of: a cluster periodicity associated with timing of first WMOs of the first cluster and the second cluster, or a difference between an indicated end time associated with the first cluster and an indicated start time associated with the second cluster.

Aspect 15: The method of any of Aspects 1-14, wherein the WUS comprises one or more of: a UE group-based downlink control information (DCI) message, a non-data-scheduling DCI message, or a UE-specific control message.

Aspect 16: The method of any of Aspects 1-15, wherein the communication comprises one or more of: an extended reality (XR) communication, or a data stream.

Aspect 17: A method of wireless communication performed by a network node, comprising: transmitting a wake up signal (WUS) within a WUS monitoring occasion (WMO) indicating to initiate a discontinuous reception (DRX) on-duration, a time to initiate the DRX on-duration being based at least in part on a timing of the WMO within a set of WMOs; and transmitting a communication based at least in part on initiating the DRX on-duration at the time.

Aspect 18: The method of Aspect 17, wherein the set of WMOs are associated with a reference start time, and wherein the time is offset from the reference start time by an amount that is based at least in part on the timing of the WMO within the set of WMOs.

Aspect 19: The method of any of Aspects 17 or 18, wherein the set of WMOs are associated with a single DRX on-duration occasion.

Aspect 20: The method of any of Aspects 17-19, further comprising: transmitting an indication of a configuration of the set of WMOs, the configuration being associated with one or more of: an offset of an earliest WMO of the set of WMOs relative to a reference start time of a DRX on-duration occasion, an offset of a latest WMO of the set of WMOs relative to the reference start time of a DRX on-duration occasion, a number of WMOs of the set of WMOs, or an indication of a mapping from the timing of the WMO to the time for initiating the DRX on-duration.

Aspect 21: The method of any of Aspects 17-20, wherein the set of WMOs comprises: one or more additional WMOs having different starting times.

Aspect 22: The method of Aspect 21, wherein the different starting times are based at least in part on a timing resolution initiating DRX on-duration by one or more connected user equipment.

Aspect 23: The method of any of Aspects 21 or 22, wherein two or more WMOs of the set of WMOs include the WUS, and wherein the time is based at least in part on: a first timing of an earliest WMO that includes the WUS indicating to wake up, a second timing of a latest WMO that includes the WUS indicating to wake up, or a third timing associated with at least two WMOs that include the WUS indicating to wake up.

Aspect 24: The method of any of Aspects 21-23, wherein, after an earliest WMO that includes the WUS, each WMO of the set of WMOs includes the WUS indicating that a user equipment is to wake up.

Aspect 25: The method of any of Aspects 17-24, wherein the set of WMOs include non-consecutive time resources with intervals between adjacent time resources that are based at least in part on a WMO configuration.

Aspect 26: The method of any of Aspects 17-25, further comprising transmitting an indication of a timing of the set of WMOs, wherein the indication comprises one or more of: an indication of a first offset from a reference time of a DRX on-duration occasion, the first offset indicating an earliest WMO, an indication of a second offset from the reference time of the DRX on-duration occasion, the second offset indicating a latest WMO, an indication of a third offset from the latest WMO, the third offset indicating the earliest WMO, or an indication of a fourth offset from the earliest WMO, the fourth offset indicating the latest WMO.

Aspect 27: The method of Aspect 26, wherein one or more of the first offset or the second offset is a zero-value offset or a negative-value offset, and wherein one or more of the earliest WMO or the latest WMO has resources that occur after the reference time of the DRX on-duration occasion.

Aspect 28: The method of any of Aspects 17-27, wherein the time of initiating the DRX on-duration is offset from an additional time of receiving the WUS based at least in part on one or more of: an indication of the offset, or a capability of a user equipment.

Aspect 29: The method of any of Aspects 17-28, wherein the set of WMOs comprises: a first cluster of multiple WMOs and a second cluster of multiple WMOs, the first cluster separated from the second cluster by one or more time resources.

Aspect 30: The method of Aspect 29, wherein the first cluster and the second cluster are separated by the one or more time resources based at least in part on one or more of: a cluster periodicity associated with timing of first WMOs of the first cluster and the second cluster, or a difference between an indicated end time associated with the first cluster and an indicated start time associated with the second cluster.

Aspect 31: The method of any of Aspects 17-30, wherein the WUS comprises one or more of: a UE group-based downlink control information (DCI) message, a non-data-scheduling DCI message, or a user-equipment-specific control message.

Aspect 32: The method of any of Aspects 17-31, wherein the communication comprises one or more of: an extended reality (XR) communication, or a data stream.

Aspect 33: An apparatus for wireless communication at a device, comprising a processor; memory coupled with the processor; and instructions stored in the memory and executable by the processor to cause the apparatus to perform the method of one or more of Aspects 1-32.

Aspect 34: A device for wireless communication, comprising a memory and one or more processors coupled to the memory, the one or more processors configured to perform the method of one or more of Aspects 1-32.

Aspect 35: An apparatus for wireless communication, comprising at least one means for performing the method of one or more of Aspects 1-32.

Aspect 36: A non-transitory computer-readable medium storing code for wireless communication, the code comprising instructions executable by a processor to perform the method of one or more of Aspects 1-32.

Aspect 37: A non-transitory computer-readable medium storing a set of instructions for wireless communication, the set of instructions comprising one or more instructions that, when executed by one or more processors of a device, cause the device to perform the method of one or more of Aspects 1-32.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
one or more memories; and
one or more processors, coupled to the one or more memories, configured to:
receive a wake up signal (WUS) within a WUS monitoring occasion (WMO) indicating to initiate a discontinuous reception (DRX) on-duration, a time to initiate the DRX on-duration being based at least in part on a timing of the WMO within a set of WMOs, wherein the set of WMOs are associated with a reference start time, and wherein the time is offset from the reference start time by an amount that is based at least in part on the timing of the WMO within the set of WMOs; and
receive a communication based at least in part on initiating the DRX on-duration at the time.

2. The UE of claim 1, wherein the set of WMOs are associated with a single DRX on-duration occasion.

3. The UE of claim 1, wherein the one or more processors are further configured to:

receive an indication of a configuration of the set of WMOs, the configuration being associated with one or more of:
an offset of an earliest WMO of the set of WMOs relative to the reference start time, wherein the reference start time is of a DRX on-duration occasion,
an offset of a latest WMO of the set of WMOs relative to the reference start time, wherein the reference start time is of a DRX on-duration occasion,
a number of WMOs of the set of WMOs, or
an indication of a mapping from the timing of the WMO to the time for initiating the DRX on-duration.

4. The UE of claim 1, wherein the one or more processors are further configured to:
monitor for the WUS within multiple WMOs having different starting times.

5. The UE of claim 4, wherein two or more of the multiple WMOs include the WUS, and
wherein the time is based at least in part on:
a first timing of an earliest WMO that includes the WUS indicating the UE to wake up,
a second timing of a latest WMO that includes the WUS indicating the UE to wake up, or
a third timing associated with at least two WMOs that include the WUS indicating the UE to wake up.

6. The UE of claim 4, wherein, after an earliest WMO that includes the WUS, each WMO of the set of WMOs includes the WUS indicating that the UE is to wake up.

7. The UE of claim 1, wherein the set of WMOs include non-consecutive time resources with intervals between adjacent time resources that are based at least in part on a WMO configuration.

8. The UE of claim 1, wherein the one or more processors are further configured to receive an indication of a timing of the set of WMOs, wherein the indication comprises one or more of:
an indication of a first offset from a reference time of a DRX on-duration occasion, the first offset indicating an earliest WMO,
an indication of a second offset from the reference time of the DRX on-duration occasion, the second offset indicating a latest WMO,
an indication of a third offset from the latest WMO, the third offset indicating the earliest WMO, or
an indication of a fourth offset from the earliest WMO, the fourth offset indicating the latest WMO.

9. The UE of claim 8, wherein one or more of the first offset or the second offset is a zero-value offset or a negative-value offset, and
wherein one or more of the earliest WMO or the latest WMO has resources that occur after the reference time of the DRX on-duration occasion.

10. The UE of claim 1, wherein the time of initiating the DRX on-duration is offset from an additional time of receiving the WUS based at least in part on one or more of:
an indication of the offset from the additional time of receiving the WUS, or
a capability of the UE.

11. The UE of claim 1, wherein the set of WMOs comprises:
a first cluster of multiple WMOs and a second cluster of multiple WMOs, the first cluster separated from the second cluster by one or more time resources.

12. The UE of claim 11, wherein the first cluster and the second cluster are separated by the one or more time resources based at least in part on one or more of:
a cluster periodicity associated with timing of first WMOs of the first cluster and the second cluster, or
a difference between an indicated end time associated with the first cluster and an indicated start time associated with the second cluster.

13. The UE of claim 1, wherein the WUS comprises one or more of:
a UE group-based downlink control information (DCI) message,
a non-data-scheduling DCI message, or
a UE-specific control message.

14. The UE of claim 1, wherein the communication comprises one or more of:
an extended reality (XR) communication, or
a data stream.

15. A network node for wireless communication, comprising:
one or more memories; and
one or more processors, coupled to the one or more memories, configured to:
transmit a wake up signal (WUS) within a WUS monitoring occasion (WMO) indicating to initiate a discontinuous reception (DRX) on-duration, a time to initiate the DRX on-duration being based at least in part on a timing of the WMO within a set of WMOs, wherein the set of WMOs are associated with a reference start time, and wherein the time is offset from the reference start time by an amount that is based at least in part on the timing of the WMO within the set of WMOs; and
transmit a communication based at least in part on initiating the DRX on-duration at the time.

16. The network node of claim 15, wherein the set of WMOs are associated with a single DRX on-duration occasion.

17. The network node of claim 15, wherein the one or more processors are further configured to:
transmit an indication of a configuration of the set of WMOs, the configuration being associated with one or more of:
an offset of an earliest WMO of the set of WMOs relative to the reference start time, wherein the reference start time is of a DRX on-duration occasion,
an offset of a latest WMO of the set of WMOs relative to the reference start time, wherein the reference start time is of a DRX on-duration occasion,
a number of WMOs of the set of WMOs, or
an indication of a mapping from the timing of the WMO to the time for initiating the DRX on-duration.

18. The network node of claim 15, wherein the set of WMOs comprises:
one or more additional WMOs having different starting times.

19. The network node of claim 18, wherein two or more WMOs of the set of WMOs include the WUS, and
wherein the time is based at least in part on:
a first timing of an earliest WMO that includes the WUS indicating to wake up,
a second timing of a latest WMO that includes the WUS indicating to wake up, or
a third timing associated with at least two WMOs that include the WUS indicating to wake up.

20. The network node of claim 18, wherein, after an earliest WMO that includes the WUS, each WMO of the set of WMOs includes the WUS indicating that a user equipment is to wake up.

21. The network node of claim 15, wherein the one or more processors are further configured to transmit an indication of a timing of the set of WMOs, wherein the indication comprises one or more of:
- an indication of a first offset from a reference time of a DRX on-duration occasion, the first offset indicating an earliest WMO,
- an indication of a second offset from the reference time of the DRX on-duration occasion, the second offset indicating a latest WMO,
- an indication of a third offset from the latest WMO, the third offset indicating the earliest WMO, or
- an indication of a fourth offset from the earliest WMO, the fourth offset indicating the latest WMO.

22. The network node of claim 15, wherein the time of initiating the DRX on-duration is offset from an additional time of receiving the WUS based at least in part on one or more of:
- an indication of the offset from the additional time of receiving the WUS, or
- a capability of a user equipment.

23. The network node of claim 15, wherein the set of WMOs comprises:
- a first cluster of multiple WMOs and a second cluster of multiple WMOs, the first cluster separated from the second cluster by one or more time resources.

24. The network node of claim 23, wherein the first cluster and the second cluster are separated by the one or more time resources based at least in part on one or more of:
- a cluster periodicity associated with timing of first WMOs of the first cluster and the second cluster, or
- a difference between an indicated end time associated with the first cluster and an indicated start time associated with the second cluster.

25. A method of wireless communication performed by a user equipment (UE), comprising:
- receiving a wake up signal (WUS) within a WUS monitoring occasion (WMO) indicating to initiate a discontinuous reception (DRX) on-duration, a time to initiate the DRX on-duration being based at least in part on a timing of the WMO within a set of WMOs, wherein the set of WMOs are associated with a reference start time, and wherein the time is offset from the reference start time by an amount that is based at least in part on the timing of the WMO within the set of WMOs; and
- receiving a communication based at least in part on initiating the DRX on-duration at the time.

26. The method of claim 25, wherein the set of WMOs are associated with a single DRX on-duration occasion.

27. The method of claim 25, further comprising:
- monitoring for the WUS within multiple WMOs having different starting times.

28. A method of wireless communication performed by a network node, comprising:
- transmitting a wake up signal (WUS) within a WUS monitoring occasion (WMO) indicating to initiate a discontinuous reception (DRX) on-duration, a time to initiate the DRX on-duration being based at least in part on a timing of the WMO within a set of WMOs, wherein the set of WMOs are associated with a reference start time, and wherein the time is offset from the reference start time by an amount that is based at least in part on the timing of the WMO within the set of WMOs; and
- transmitting a communication based at least in part on initiating the DRX on-duration at the time.

29. The method of claim 28, wherein the set of WMOs are associated with a single DRX on-duration occasion.

30. The method of claim 28, wherein the set of WMOs comprises:
- one or more additional WMOs having different starting times.

* * * * *